(12) United States Patent
Schofield et al.

(10) Patent No.: US 7,423,248 B2
(45) Date of Patent: *Sep. 9, 2008

(54) AUTOMATIC EXTERIOR LIGHT CONTROL FOR A VEHICLE

(75) Inventors: Kenneth Schofield, Holland, MI (US); Mark L. Larson, Grand Haven, MI (US); Keith J. Vadas, Coopersville, MI (US)

(73) Assignee: Donnelly Corporation, Holland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/936,166

(22) Filed: Nov. 7, 2007

(65) Prior Publication Data

US 2008/0054161 A1 Mar. 6, 2008

Related U.S. Application Data

(63) Continuation of application No. 11/626,535, filed on Jan. 24, 2007, which is a continuation of application No. 11/545,039, filed on Oct. 6, 2006, now Pat. No. 7,402,786, which is a continuation of application No. 09/441,341, filed on Nov. 16, 1999, now Pat. No. 7,339,149, which is a continuation of application No. 09/135,565, filed on Aug. 17, 1998, now Pat. No. 6,097,023, which is a continuation of application No. 08/621,863, filed on Mar. 25, 1996, now Pat. No. 5,796,094, which is a continuation-in-part of application No. 08/023,918, filed on Feb. 26, 1993, now Pat. No. 5,550,677, said application No. 11/545,039 is a continuation-in-part of application No. 11/246,593, filed on Oct. 6, 2005, now Pat. No. 7,344,261, which is a continuation of application No. 10/940,700, filed on Sep. 14, 2004, now Pat. No. 6,953,253, which is a continuation of application No. 10/372,873, filed on Feb. 24, 2003, now Pat. No. 6,802,617, which is a continuation of application No. 09/975,232, filed on Oct. 11, 2001, now Pat. No. 6,523,964, which is a continuation of application No. 09/227,344, filed on Jan. 8, 1999, now Pat. No. 6,302,545, which is a continuation of application No. 08/478,093, filed on Jun. 7, 1995, now Pat. No. 5,877,897, which is a continuation-in-part of application No. PCT/US94/01954, filed on Feb. 25, 1994, and a continuation-in-part of application No. 08/023,918, filed on Feb. 26, 1993, now Pat. No. 5,550,677.

(51) Int. Cl.
*G01J 1/32* (2006.01)
(52) U.S. Cl. .................................. 250/205; 250/208.1
(58) Field of Classification Search ................. 250/205, 250/214 R, 214 AL, 221, 208.1; 359/601–610, 359/264–272; 180/167–169; 340/426.23, 340/436
See application file for complete search history.

(56) References Cited

U.S. PATENT DOCUMENTS

| | | | |
|---|---|---|---|
| 2,632,040 A | 3/1953 | Rabinow | |
| 2,827,594 A | 3/1958 | Rabinow | |
| 3,141,393 A | 7/1964 | Platt | |
| 3,601,614 A | 8/1971 | Platzer | |
| 3,612,666 A | 10/1971 | Rabinow | |
| 3,665,224 A | 5/1972 | Kelsey | |
| 3,680,951 A | 8/1972 | Jordan | |
| 3,689,695 A | 9/1972 | Rosenfield et al. | |
| 3,708,231 A | 1/1973 | Walters | |
| 3,746,430 A | 7/1973 | Brean | |
| 3,807,832 A | 4/1974 | Castellion | |
| 3,811,046 A | 5/1974 | Levick | |
| 3,813,540 A | 5/1974 | Albrecht | |
| 3,862,798 A | 1/1975 | Hopkins | |
| 3,947,095 A | 3/1976 | Moultrie | 350/302 |
| 3,962,600 A | 6/1976 | Pittman | |
| 3,985,424 A | 10/1976 | Steinacher | |
| 3,986,022 A | 10/1976 | Hyatt | |
| 4,037,134 A | 7/1977 | Löper | |
| 4,052,712 A | 10/1977 | Ohama et al. | |
| 4,093,364 A | 6/1978 | Miller | |
| 4,111,720 A | 9/1978 | Michel et al. | |
| 4,161,653 A | 7/1979 | Bedini | |

| | | |
|---|---|---|
| 4,200,361 A | 4/1980 | Malvano |
| 4,214,266 A | 7/1980 | Myers |
| 4,236,099 A | 11/1980 | Rosenblum |
| 4,247,870 A | 1/1981 | Gabel et al. |
| 4,249,160 A | 2/1981 | Chilvers |
| 4,266,856 A | 5/1981 | Wainwright |
| 4,277,804 A | 7/1981 | Robison |
| 4,281,898 A | 8/1981 | Ochiai |
| 4,288,814 A | 9/1981 | Talley et al. |
| 4,355,271 A | 10/1982 | Noack |
| 4,357,558 A | 11/1982 | Massoni et al. |
| 4,381,888 A | 5/1983 | Momiyama ................ 350/458 |
| 4,420,238 A | 12/1983 | Felix |
| 4,431,896 A | 2/1984 | Lodetti |
| 4,443,057 A | 4/1984 | Bauer |
| 4,460,831 A | 7/1984 | Oettinger et al. |
| 4,481,450 A | 11/1984 | Watanabe et al. ........... 318/444 |
| 4,491,390 A | 1/1985 | Tong-Shen |
| 4,512,637 A | 4/1985 | Ballmer |
| 4,529,275 A | 7/1985 | Ballmer |
| 4,529,873 A | 7/1985 | Ballmer |
| 4,549,208 A | 10/1985 | Kamejima et al. |
| 4,571,082 A | 2/1986 | Downs |
| 4,572,619 A | 2/1986 | Reininger |
| 4,580,875 A | 4/1986 | Bechtel |
| 4,603,946 A | 8/1986 | Kato |
| 4,614,415 A | 9/1986 | Hyatt |
| 4,620,141 A | 10/1986 | McCumber et al. ......... 318/483 |
| 4,623,222 A | 11/1986 | Itoh |
| 4,626,850 A | 12/1986 | Chey |
| 4,629,941 A | 12/1986 | Ellis |
| 4,630,109 A | 12/1986 | Barton |
| 4,632,509 A | 12/1986 | Ohmi |
| 4,647,161 A | 3/1987 | Müller ....................... 350/462 |
| 4,669,825 A | 6/1987 | Itoh |
| 4,669,826 A | 6/1987 | Itoh |
| 4,671,615 A | 6/1987 | Fukada |
| 4,672,457 A | 6/1987 | Hyatt |
| 4,676,601 A | 6/1987 | Itoh |
| 4,690,508 A | 9/1987 | Jacob |
| 4,692,798 A | 9/1987 | Seko et al. |
| 4,697,883 A | 10/1987 | Suzuki |
| 4,701,022 A | 10/1987 | Jacob |
| 4,713,685 A | 12/1987 | Nishimura et al. |
| 4,727,290 A | 2/1988 | Smith et al. |
| 4,731,669 A | 3/1988 | Hayashi et al. |
| 4,741,603 A | 5/1988 | Miyagi |
| 4,768,135 A | 8/1988 | Kretschmer et al. |
| 4,789,904 A | 12/1988 | Peterson |
| 4,793,690 A | 12/1988 | Gahan |
| 4,817,948 A | 4/1989 | Simonelli |
| 4,820,933 A | 4/1989 | Hong |
| 4,825,232 A | 4/1989 | Howdle |
| 4,838,650 A | 6/1989 | Stewart |
| 4,847,772 A | 7/1989 | Michalopoulos et al. |
| 4,862,037 A | 8/1989 | Farber et al. |
| 4,867,561 A | 9/1989 | Fujii et al. ................... 356/237 |
| 4,871,917 A | 10/1989 | O'Farrell et al. |
| 4,872,051 A | 10/1989 | Dye |
| 4,881,019 A | 11/1989 | Shiraishi et al. |
| 4,886,960 A | 12/1989 | Molyneux |
| 4,891,559 A | 1/1990 | Matsumoto et al. |
| 4,892,345 A | 1/1990 | Rachael, III |
| 4,895,790 A | 1/1990 | Swanson et al. ............ 430/321 |
| 4,896,030 A | 1/1990 | Miyaji |
| 4,910,591 A | 3/1990 | Petrossian et al. |
| 4,916,374 A | 4/1990 | Schierbeek |
| 4,917,477 A | 4/1990 | Bechtel et al. |
| 4,937,796 A | 6/1990 | Tendler |
| 4,956,591 A | 9/1990 | Schierbeek |
| 4,961,625 A | 10/1990 | Wood et al. |
| 4,967,319 A | 10/1990 | Seko |
| 4,970,653 A | 11/1990 | Kenue |
| 4,974,078 A | 11/1990 | Tsai |
| 4,987,357 A | 1/1991 | Masaki |
| 4,991,054 A | 2/1991 | Walters |
| 5,001,558 A | 3/1991 | Burley et al. |
| 5,003,288 A | 3/1991 | Wilhelm |
| 5,012,082 A | 4/1991 | Watanabe |
| 5,016,977 A | 5/1991 | Baude et al. ........... 350/162.17 |
| 5,027,001 A | 6/1991 | Torbert ...................... 307/10.1 |
| 5,027,200 A | 6/1991 | Petrossian et al. |
| 5,044,706 A | 9/1991 | Chen ......................... 359/357 |
| 5,055,668 A | 10/1991 | French |
| 5,059,877 A | 10/1991 | Teder ........................ 318/444 |
| 5,064,274 A | 11/1991 | Alten |
| 5,072,154 A | 12/1991 | Chen |
| 5,086,253 A | 2/1992 | Lawler |
| 5,096,287 A | 3/1992 | Kakinami et al. |
| 5,121,200 A | 6/1992 | Choi |
| 5,124,549 A | 6/1992 | Michaels et al. |
| 5,148,014 A | 9/1992 | Lynam |
| 5,168,378 A | 12/1992 | Black |
| 5,170,374 A | 12/1992 | Shimohigashi et al. |
| 5,172,235 A | 12/1992 | Wilm et al. |
| 5,182,502 A | 1/1993 | Slotkowski et al. |
| 5,184,956 A | 2/1993 | Langlais et al. |
| 5,193,029 A | 3/1993 | Schofield |
| 5,204,778 A | 4/1993 | Bechtel |
| 5,208,701 A | 5/1993 | Maeda ....................... 359/574 |
| 5,245,422 A | 9/1993 | Borcherts et al. |
| 5,253,109 A | 10/1993 | O'Farrell |
| 5,276,389 A | 1/1994 | Levers |
| 5,289,182 A | 2/1994 | Brillard et al. |
| 5,289,321 A | 2/1994 | Secor |
| 5,305,012 A | 4/1994 | Faris |
| 5,307,136 A | 4/1994 | Saneyoshi |
| 5,313,072 A | 5/1994 | Vachss |
| 5,325,096 A | 6/1994 | Pakett |
| 5,325,386 A | 6/1994 | Jewell et al. |
| 5,329,206 A | 7/1994 | Slotkowski et al. |
| 5,331,312 A | 7/1994 | Kudoh |
| 5,336,980 A | 8/1994 | Levers ....................... 318/444 |
| 5,341,437 A | 8/1994 | Nakayama |
| 5,351,044 A | 9/1994 | Mathur et al. |
| 5,355,118 A | 10/1994 | Fukuhara |
| 5,374,852 A | 12/1994 | Parkes |
| 5,386,285 A | 1/1995 | Asayama |
| 5,406,395 A | 4/1995 | Wilson et al. ................. 359/15 |
| 5,410,346 A | 4/1995 | Saneyoshi et al. |
| 5,414,257 A | 5/1995 | Stanton ................. 250/227.25 |
| 5,414,461 A | 5/1995 | Kishi et al. ................. 348/115 |
| 5,416,318 A | 5/1995 | Hegyi |
| 5,424,952 A | 6/1995 | Asayama ................... 364/443 |
| 5,426,294 A | 6/1995 | Kobayashi et al. |
| 5,430,431 A | 7/1995 | Nelson |
| 5,440,428 A | 8/1995 | Hegg et al. |
| 5,444,478 A | 8/1995 | Lelong et al. |
| 5,451,822 A | 9/1995 | Bechtel et al. |
| 5,461,357 A | 10/1995 | Yoshioka et al. |
| 5,461,361 A | 10/1995 | Moore |
| 5,469,298 A | 11/1995 | Suman et al. |
| 5,471,515 A | 11/1995 | Fossum et al. |
| 5,475,494 A | 12/1995 | Nishida et al. |
| 5,498,866 A | 3/1996 | Bendicks et al. ....... 250/227.25 |
| 5,510,983 A | 4/1996 | Iino |
| 5,515,448 A | 5/1996 | Nishitani |
| 5,528,698 A | 6/1996 | Kamei et al. |
| 5,529,138 A | 6/1996 | Shaw et al. |
| 5,530,420 A | 6/1996 | Tsuchiya et al. ............ 340/435 |
| 5,535,314 A | 7/1996 | Alves et al. |
| 5,537,003 A | 7/1996 | Bechtel et al. |
| 5,539,397 A | 7/1996 | Asanuma et al. |
| 5,541,590 A | 7/1996 | Nishio |
| 5,550,677 A | 8/1996 | Schofield et al. ............ 359/604 |
| 5,568,027 A | 10/1996 | Teder |

| | | |
|---|---|---|
| 5,574,443 A | 11/1996 | Hsieh |
| 5,614,788 A | 3/1997 | Mullins et al. |
| 5,634,709 A | 6/1997 | Iwama |
| 5,648,835 A | 7/1997 | Uzawa .................. 396/429 |
| 5,650,944 A | 7/1997 | Kise |
| 5,660,454 A | 8/1997 | Mori et al. |
| 5,661,303 A | 8/1997 | Teder .................. 250/341.8 |
| 5,670,935 A | 9/1997 | Schofield et al. .......... 340/461 |
| 5,760,826 A | 6/1998 | Nayar .................. 348/36 |
| 5,760,828 A | 6/1998 | Cortes .................. 348/143 |
| 5,760,931 A | 6/1998 | Saburi et al. |
| 5,760,962 A | 6/1998 | Schofield et al. |
| 5,765,116 A | 6/1998 | Wilson-Jones et al. |
| 5,781,437 A | 7/1998 | Wiemer et al. |
| 5,793,308 A | 8/1998 | Rosinski et al. |
| 5,793,420 A | 8/1998 | Schmidt |
| 5,796,094 A | 8/1998 | Schofield et al. ......... 250/208.1 |
| 5,798,575 A | 8/1998 | O'Farrell et al. |
| 5,837,994 A | 11/1998 | Stam et al. ............. 250/208.1 |
| 5,844,682 A | 12/1998 | Kiyomoto et al. |
| 5,845,000 A | 12/1998 | Breed et al. |
| 5,848,802 A | 12/1998 | Breed et al. |
| 5,850,176 A | 12/1998 | Kinoshita et al. .......... 340/435 |
| 5,850,254 A * | 12/1998 | Takano et al. ............. 348/148 |
| 5,867,591 A | 2/1999 | Onda .................. 382/154 |
| 5,877,897 A | 3/1999 | Schofield et al. |
| 5,883,739 A | 3/1999 | Ashihara et al. .......... 359/462 |
| 5,890,021 A | 3/1999 | Onoda .................. 396/121 |
| 5,896,085 A | 4/1999 | Mori et al. ............. 340/469 |
| 5,923,027 A | 7/1999 | Stam et al. ............. 250/208.1 |
| 5,949,331 A | 9/1999 | Schofield et al. .......... 340/461 |
| 5,959,555 A | 9/1999 | Furuta |
| 5,963,247 A | 10/1999 | Banitt |
| 5,990,469 A | 11/1999 | Bechtel et al. .......... 250/208.1 |
| 6,020,704 A | 2/2000 | Buschur .................. 318/483 |
| 6,049,171 A | 4/2000 | Stam et al. .................. 315/82 |
| 6,066,933 A | 5/2000 | Ponziana |
| 6,084,519 A | 7/2000 | Coulling et al. |
| 6,087,953 A | 7/2000 | DeLine et al. .......... 340/815.4 |
| 6,097,023 A | 8/2000 | Schofield et al. |
| 6,097,024 A | 8/2000 | Stam et al. ............. 250/208.1 |
| 6,124,886 A | 9/2000 | DeLine et al. ............. 348/148 |
| 6,144,022 A | 11/2000 | Tennenbaum et al. .... 250/208.1 |
| 6,172,613 B1 | 1/2001 | DeLine et al. .......... 340/815.4 |
| 6,201,642 B1 | 3/2001 | Bos .................. 359/565 |
| 6,222,447 B1 | 4/2001 | Schofield et al. .......... 340/461 |
| 6,243,003 B1 | 6/2001 | DeLine et al. |
| 6,302,545 B1 | 10/2001 | Schofield et al. |
| 6,313,454 B1 | 11/2001 | Bos et al. |
| 6,320,176 B1 | 11/2001 | Schofield et al. |
| 6,396,397 B1 | 5/2002 | Schofield et al. |
| 6,411,328 B1 | 6/2002 | Franke et al. |
| 6,424,273 B1 | 7/2002 | Gutta et al. .................. 340/937 |
| 6,433,676 B2 | 8/2002 | DeLine et al. |
| 6,442,465 B2 | 8/2002 | Breed et al. |
| 6,498,620 B2 | 12/2002 | Schofield et al. |
| 6,523,964 B2 | 2/2003 | Schofield et al. |
| 6,534,884 B2 | 3/2003 | Marcus et al. ............. 307/10.1 |
| 6,553,130 B1 | 4/2003 | Lemelson et al. .......... 382/104 |
| 6,559,435 B2 | 5/2003 | Schofield et al. |
| 6,611,202 B2 | 8/2003 | Schofield et al. |
| 6,636,258 B2 | 10/2003 | Strumolo .................. 348/149 |
| 6,650,233 B2 | 11/2003 | DeLine et al. |
| 6,672,731 B2 | 1/2004 | Schnell et al. ............. 359/877 |
| 6,717,610 B1 | 4/2004 | Bos et al. .................. 348/148 |
| 6,802,617 B2 | 10/2004 | Schofield et al. |
| 6,822,563 B2 | 11/2004 | Bos et al. |
| 6,831,261 B2 | 12/2004 | Schofield et al. |
| 6,891,563 B2 | 5/2005 | Schofield et al. |
| 6,953,253 B2 | 10/2005 | Schofield et al. |
| 7,227,459 B2 | 6/2007 | Bos et al. |
| 2002/0015153 A1 | 2/2002 | Downs |
| 2002/0126875 A1 | 9/2002 | Naoi et al. |
| 2004/0051634 A1 | 3/2004 | Schofield et al. |
| 2004/0200948 A1 | 10/2004 | Bos et al. |
| 2005/0146792 A1 | 7/2005 | Schofield et al. |
| 2005/0200700 A1 | 9/2005 | Schofield et al. |
| 2005/0219852 A1 | 10/2005 | Stam et al. |
| 2006/0018511 A1 | 1/2006 | Stam et al. |
| 2006/0018512 A1 | 1/2006 | Stam et al. |
| 2006/0028731 A1 | 2/2006 | Schofield et al. |
| 2006/0091813 A1 | 5/2006 | Stam et al. |
| 2007/0023613 A1 | 2/2007 | Schofield et al. |
| 2007/0109406 A1 | 5/2007 | Schofield et al. |
| 2007/0109652 A1 | 5/2007 | Schofield et al. |
| 2007/0109653 A1 | 5/2007 | Schofield et al. |
| 2007/0109654 A1 | 5/2007 | Schofield et al. |
| 2007/0120657 A1 | 5/2007 | Schofield et al. |
| 2007/0120706 A1 | 5/2007 | Schofield et al. |
| 2007/0176080 A1 | 8/2007 | Schofield et al. |

FOREIGN PATENT DOCUMENTS

| | | |
|---|---|---|
| DE | 2133182 | 1/1973 |
| DE | 2808260 | 8/1979 |
| DE | 3041612 | 11/1980 |
| DE | P2931368 A1 | 2/1981 |
| DE | 2946561 A | 5/1981 |
| DE | 3041692 | 5/1981 |
| DE | 3248511 A1 | 7/1984 |
| DE | 4107965 A1 | 9/1991 |
| DE | 4118208 | 11/1991 |
| DE | 4139515 A1 | 6/1992 |
| DE | 4123641 A1 | 1/1993 |
| EP | 48506 | 6/1985 |
| EP | 0202460 | 11/1986 |
| EP | 48810 | 10/1988 |
| EP | 0416222 A2 | 3/1991 |
| EP | 0426503 | 5/1991 |
| EP | 0450553 A2 | 10/1991 |
| EP | 0492591 | 7/1992 |
| EP | 0513476 A1 | 11/1992 |
| EP | 0788947 | 8/1997 |
| EP | 0669559 | 8/1999 |
| EP | 0830267 B1 | 12/2001 |
| FR | 2241085 | 4/1973 |
| FR | 2513198 | 3/1983 |
| FR | 2585991 | 2/1987 |
| FR | 2 641 237 A1 | 7/1990 |
| FR | 2672857 | 8/1992 |
| FR | 2673499 | 9/1992 |
| FR | 2726144 | 4/1996 |
| GB | 934037 | 8/1963 |
| GB | 1535182 | 12/1978 |
| GB | 2029343 | 3/1980 |
| GB | 2119087 | 11/1983 |
| GB | 2137373 | 10/1984 |
| GB | 2137573 A | 10/1984 |
| GB | 2156295 | 10/1985 |
| GB | 2244187 A | 11/1991 |
| GB | 2255539 A | 11/1992 |
| GB | 2267341 | 12/1993 |
| GB | 2327823 A | 2/1999 |
| JP | 5630305 | 8/1979 |
| JP | 55039843 | 3/1980 |
| JP | 57-173801 | 10/1982 |
| JP | 57-208530 | 12/1982 |
| JP | 58-19941 | 12/1982 |
| JP | 57-208531 | 2/1983 |
| JP | 58110334 | 6/1983 |
| JP | 58209635 | 12/1983 |
| JP | 59-51325 | 3/1984 |
| JP | 5951301 | 4/1984 |
| JP | 59114139 | 7/1984 |
| JP | 59133336 | 9/1984 |
| JP | 6080953 | 5/1985 |

| | | |
|---|---|---|
| JP | 0-212730 | 10/1985 |
| JP | 60166651 | 11/1985 |
| JP | 60261275 | 12/1985 |
| JP | 6154942 | 4/1986 |
| JP | 6156638 | 4/1986 |
| JP | 6243543 | 2/1987 |
| JP | 62-131837 | 6/1987 |
| JP | 62122487 | 6/1987 |
| JP | 62122844 | 6/1987 |
| JP | 6414700 | 1/1989 |
| JP | 01123587 | 5/1989 |
| JP | 30061192 | 3/1991 |
| JP | 03099952 | 4/1991 |
| JP | 042394 | 11/1991 |
| JP | 3284413 | 12/1991 |
| JP | 417386 | 4/1992 |
| JP | 4114587 | 4/1992 |
| JP | 40245886 | 9/1992 |
| JP | 50000638 | 1/1993 |
| JP | 0550883 | 3/1993 |
| JP | 0577657 | 3/1993 |
| JP | 5213113 | 8/1993 |
| JP | 6107035 | 4/1994 |
| JP | 6227318 | 8/1994 |
| JP | 06-267304 | 9/1994 |
| JP | 06276524 A | 9/1994 |
| JP | 06-295601 | 10/1994 |
| JP | 074170 | 1/1995 |
| JP | 7-32936 | 2/1995 |
| JP | 7-47878 | 2/1995 |
| JP | 7-052706 | 2/1995 |
| JP | 7-69125 | 3/1995 |
| JP | 07105496 | 4/1995 |
| JP | 08166221 | 6/1996 |
| JP | 2630604 | 4/1997 |
| WO | WO 86/05147 | 9/1986 |
| WO | WO-9419212 A | 9/1994 |
| WO | 9427262 | 11/1994 |
| WO | WO9621581 A | 7/1996 |
| WO | 9638319 | 12/1996 |
| WO | 9735743 | 10/1997 |
| WO | WO9735743 | 10/1997 |
| WO | 9814974 | 4/1998 |
| WO | 9858450 | 12/1998 |
| WO | 9914088 | 3/1999 |
| WO | 9923828 | 5/1999 |

OTHER PUBLICATIONS

Kobe, Gerry, "Hypnotic Wizardry! (interior electronics)," *Automotive Industries*, vol. 169, NO. 5, p. 60, published May 1989. Relevant section is entitled INSTRUMENTATION.

SAE Information Report, "Vision Factors Considerations in Rear View Mirror Design—SAE J985 OCT88," approved Oct. 1988, and located in *1995 SAE Handbook*, vol. 3.

Hamit, Francis "360-Degree Interactivity: New Video and Still Cameras Provide a Global Roaming Viewpoint", *Advanced Imaging*, Mar. 1997, p. 50.

Johannes, Laura "A New Microchip Ushers In Cheaper Digital Cameras", *The Wall Street Journal*, Aug. 21, 1998, p. B1.

Article entitled "Generation of Vision Technology," published by VLSI Vision Limited, publication date unknown.

Article entitled "On-Chip CMOS Sensors for VLSI Imaging Systems," published by VLSI Vision Limited, 1991.

Wang, G., et al. "CMOS Video Cameras", IEEE, 1991, p. 100-103.

Ballard, Dana H. et al., "Computer Vision", p. 88-89, sect. 3.4.1.

Decision—Motions—Bd. R. 125(a), issued Aug. 29, 2006 in connection with Interference No. 105,325, which involved U.S. Appl. No. 09/441,341, filed Nov. 16, 1999 by Schofield et al. and U.S. Patent No. 5,837,994, issued to Stam et al.

Reexamination Control No. 90/007,519, Reexamination of U.S. Appl. No. 6,222,447, issued to Schofield et al., no date.

Reexamination Control No. 90/007,520, Reexamination of U.S. Appl. No. 5,949,331, issued to Schofield et al., no date.

Search Report from European Patent Application No. EP 96 91 6533, no date.

* cited by examiner

*Primary Examiner*—Que T Le
(74) *Attorney, Agent, or Firm*—Van Dyke, Gardner, Linn & Burkhart LLP

(57) ABSTRACT

An automatic exterior light control includes an image array sensor and a controller. The image array sensor includes an array of pixel sensors, and is configured and mounted such that a field of view of the image array sensor substantially passes through an associated windshield area that is wiped by a windshield wiper. The controller is connected to the image array sensor and configured to receive at least a portion of at least one image from the image array sensor that is substantially free of windshield surface contamination.

24 Claims, 11 Drawing Sheets

NORMAL (DRY) CONDITIONS:

FOGGY CONDITIONS:

AUTOMATIC EXTERIOR LIGHT CONTROL FOR A VEHICLE

CROSS-REFERENCE TO RELATED APPLICATIONS

This application is a continuation of U.S. patent application Ser. No. 11/626,535, filed Jan. 24, 2007, which is a continuation of U.S. patent application Ser. No. 11/545,039, filed Oct. 6, 2006, now U.S. Pat. No. 7,402,786 which is a continuation of U.S. patent application Ser. No. 09/441,341, filed Nov. 16, 1999, now U.S. Pat. No. 7,339,149, which is a continuation of U.S. patent application Ser. No. 09/135,565, filed Aug. 17, 1998, now U.S. Pat. No. 6,097,023, which is a continuation of U.S. patent application Ser. No. 08/621,863, filed Mar. 25, 1996, now U.S. Pat. No. 5,796,094, which is continuation-in-part of U.S. patent application Ser. No. 08/023,918 filed Feb. 26, 1993, by Kenneth Schofield and Mark Larson, now U.S. Pat. No. 5,550,677; and application Ser. No. 11/545,039 is a continuation-in-part of U.S. patent application Ser. No. 11/246,593, filed Oct. 6, 2005 by Schofield et al. for VEHICULAR VISION SYSTEM, now U.S. Pat. No. 7,344,261, which is a continuation of U.S. patent application Ser. No. 10/940,700, filed Sep. 14, 2004, now U.S. Pat. No. 6,953,253, which is a continuation of U.S. patent application Ser. No. 10/372,873, filed Feb. 24, 2003, now U.S. Pat. No. 6,802,617, which is a continuation of U.S. patent application Ser. No. 09/975,232, filed Oct. 11, 2001, now U.S. Pat. No. 6,523,964, which is a continuation of U.S. patent application Ser. No. 09/227,344, filed Jan. 8, 1999, now U.S. Pat. No. 6,302,545, which is a continuation of U.S. patent application Ser. No. 08/478,093, filed on Jun. 7, 1995, now U.S. Pat. No. 5,877,897, which is a continuation-in-part of International PCT Application No. PCT/US94/01954, which designates the United States and which was filed Feb. 25, 1994 and which is a continuation-in-part of U.S. patent application Ser. No. 08/023,918, filed Feb. 26, 1993, now U.S. Pat. No. 5,550,677.

BACKGROUND OF THE INVENTION

This invention relates generally to vehicle control systems and, in particular, to a system and method for controlling the headlights of the vehicles. The invention is particularly adapted to controlling the vehicle's headlamps in response to sensing the headlights of oncoming vehicles and taillights of leading vehicles.

It has long been a goal to automatically control the state of a vehicle's headlights in order to accomplish automatically that which is manually performed by the driver. In particular, the driver of a vehicle whose headlights are in a high-beam state will dim the headlights upon conscious realization that the headlights are a distraction to the driver of an oncoming vehicle or a leading vehicle. It is desirable to relieve the driver of such duties and thereby allow the driver to concentrate on the driving task at hand. The ideal automatic control would also facilitate the use of high beams in conditions which allow their use, increasing the safety for the controlled vehicle as well as reducing the hazard caused by the occasional failure of the driver to dim the headlights when such headlights are distracting another driver.

Prior attempts at vehicle headlight dimming controls have included a single light sensor which integrates light in the scene forward of the vehicle. When the integrated light exceeds a threshold, the vehicle headlights are dimmed. Such approaches have been ineffective. The headlights of oncoming vehicles are, at least from a distance, point sources of light. In order to detect such light sources in an integrated scene, it is necessary to set a sufficiently low threshold of detection that many non-point-sources at lower intensities are interpreted as headlights or taillights. Such prior art vehicle headlight dimming controls have also been ineffective at reliably detecting the taillights of leading vehicles. The apparent reason is that the characteristics of these two light sources; for example, intensity, are so different that detecting both has been impractical. In order to overcome such deficiencies, additional solutions have been attempted, such as the use of infrared filtering, baffling of the optic sensor, and the like. While such modifications may have improved performance somewhat, the long-felt need for a commercially useful vehicle headlight dimming control has gone unmet.

SUMMARY OF THE INVENTION

The present invention provides a vehicle control which is capable of identifying unique characteristics of light sources based upon a precise evaluation of light source characteristics made in each portion of the scene forward of the vehicle, in the vicinity of each light source, by separating each light source from the remainder of the scene and analyzing that source to determine its characteristics. One characteristic used in identifying a light source is the spectral characteristics of that source which is compared with spectral signatures of known light sources, such as those of headlights and taillights. Another characteristic used in identifying a light source is the spatial layout of the light source. By providing the ability to identify the headlights of oncoming vehicles and the taillights of leading vehicles, the state of the headlights of the controlled vehicle may be adjusted in response to the presence or absence of either of these light sources or the intensity of these light sources.

This is accomplished according to an aspect of the invention by providing an imaging sensor which divides the scene forward of the vehicle into a plurality of spatially separated sensing regions. A control circuit is provided that is responsive to the photosensors in order to determine if individual regions include light levels having a particular intensity. The control circuit thereby identifies particular light sources and provides a control output to the vehicle that is a function of the light source identified. The control output may control the dimmed state of the vehicle's headlamps.

In order to more robustly respond to the different characteristics of headlights and taillights, a different exposure period is provided for the array in order to detect each light source. In particular, the exposure period may be longer for detecting leading taillights and significantly shorter for detecting oncoming headlights.

According to another aspect of the invention, a solid-state light imaging array is provided that is made up of a plurality of sensors arranged in a matrix on at least one semiconductor substrate. The light-imaging array includes at least one spectral separation device, wherein each of the sensors responds to light in a particular spectral region. The control circuit responds to the plurality of sensors in order to determine if spatially adjacent regions of the field of view forward of the vehicle include light of a particular spectral signature above a particular intensity level. In this manner, the control identifies light sources that are either oncoming headlights or leading taillights by identifying such light sources according to their spectral makeup.

According to another aspect of the invention, a solid-state light-imaging array is provided that is made up of a plurality of sensors that divide the scene forward of the vehicle into spatially separated regions, and light sources are identified, at least in part, according to their spatial distribution across the regions. This aspect of the invention is based upon a recognition that headlights of oncoming vehicles and taillights of leading vehicles are of interest to the control, irrespective of separation distance from the controlled vehicle, if the source is on the central axis of travel of the vehicle. Oncoming headlights and leading taillights may also be of interest away from this axis, or off axis, but only if the source has a higher intensity level and is spatially larger. These characteristics of headlights and taillights of interest may be taken into consideration by increasing the resolution of the imaging array along this central axis or by increasing the detection threshold off axis, or both. Such spatial evaluation may be implemented by selecting characteristics of an optical device provided with the imaging sensor, such as providing increased magnification central of the forward scene, or providing a wide horizontal view and narrow vertical view, or the like, or by arrangement of the sensing circuitry, or a combination of these.

The present invention provides a vehicle headlight control which is exceptionally discriminating in identifying oncoming headlights and leading taillights in a commercially viable system which ignores other sources of light including streetlights and reflections of the controlled vehicle's headlights off signs, road markers, and the like. The present invention further provides a sensor having the ability to preselect data from the scene forward of the vehicle in order to reduce the input data set to optimize subsequent data processing. The invention is especially adapted for use with, but not limited to, photoarray imaging sensors, such as CMOS and CCD arrays.

These and other objects, advantages, and features of this invention will become apparent upon review of the following specification in conjunction with the drawings.

DESCRIPTION OF THE PREFERRED EMBODIMENT

Figure 1:
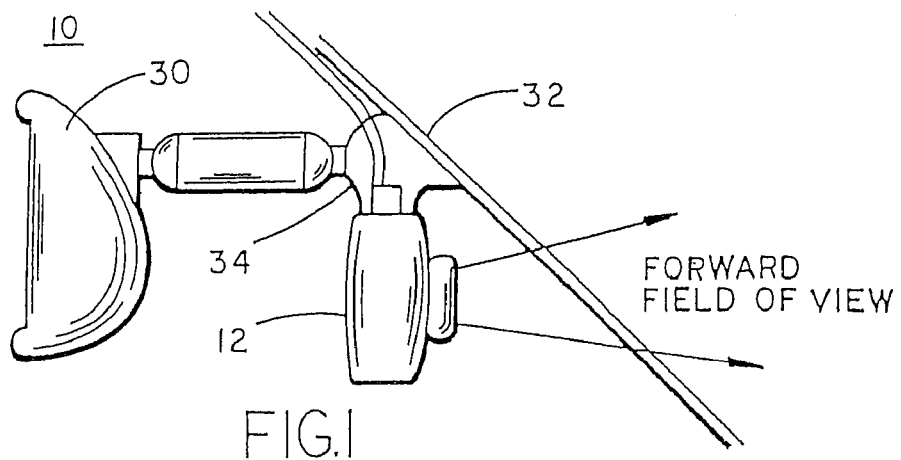
FIG. 1 is a side elevation of a portion of a vehicle embodying the invention.
Figure 2:
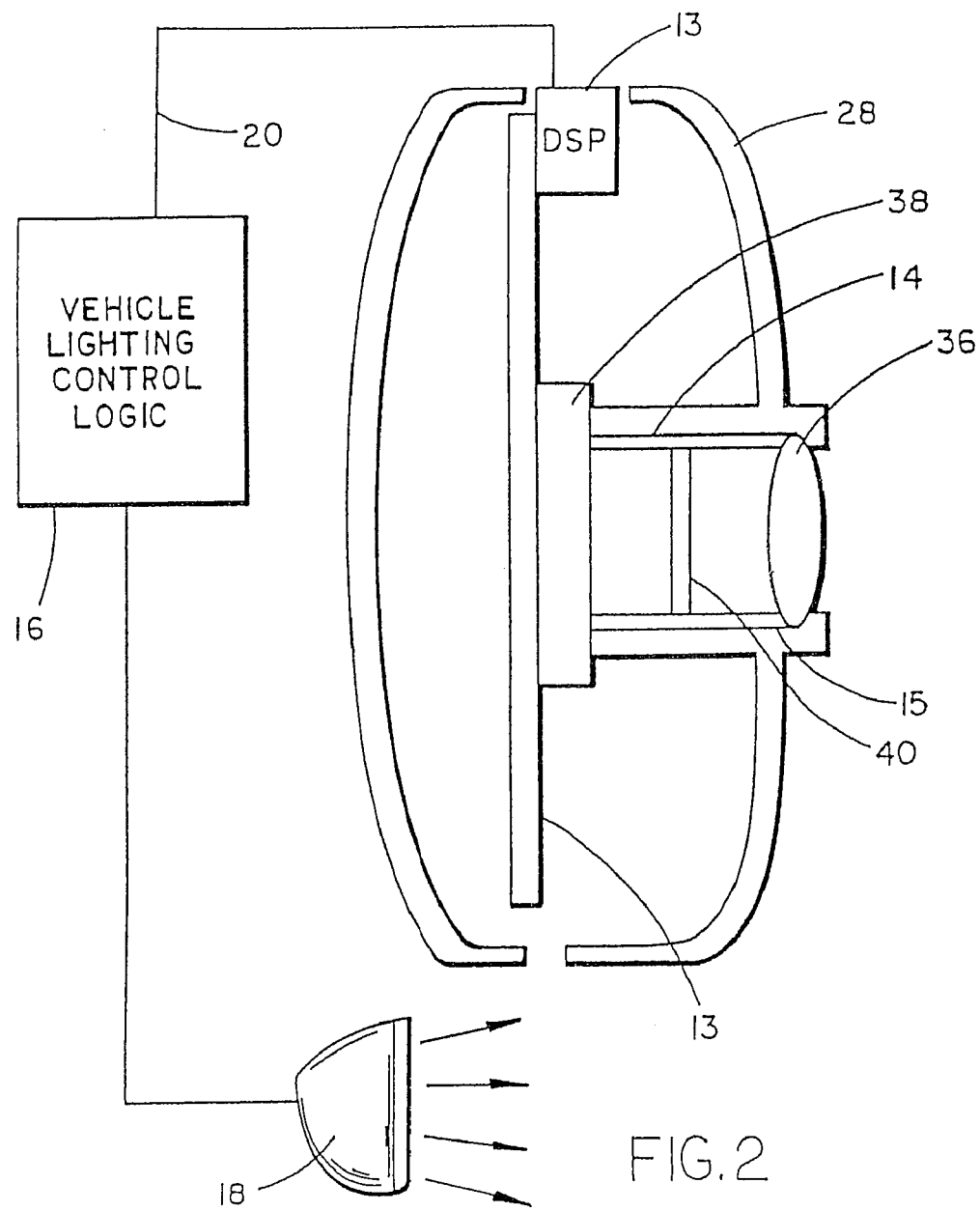
FIG. 2 is a partial side elevation view and block diagram of a vehicle headlight dimming control system according to the invention.

Referring now specifically to the drawings and the illustrative embodiments depicted therein, a vehicle 10 includes a vehicle headlight dimming control 12 made up of an imaging sensor module 14 which senses light from a scene forward of vehicle 10, an imaging control circuit 13 which receives data from sensor 14, and a vehicle lighting control logic module 16 which exchanges data with control circuit 13 and controls headlamps 18 for the purpose of modifying the headlight beam (FIGS. 1 and 2). Such control may be a binary control of the aim of the beam, such as by switching between lamps or lamp filaments, or may be a continuous variation of the aim of a single lamp more or less forward of the vehicle. The control may also control the intensity or pattern of the beam. Additionally, the lights of a vehicle equipped with daytime running lights may be switched between a daytime running light condition and a low-beam condition. Vehicle headlight dimming control 12 can perform a wide range of additional control operations on the vehicle, including turning the headlights ON and OFF, modifying the light intensity of the instrument panel, and providing an input to an electro-optic mirror system.

Figure 10:
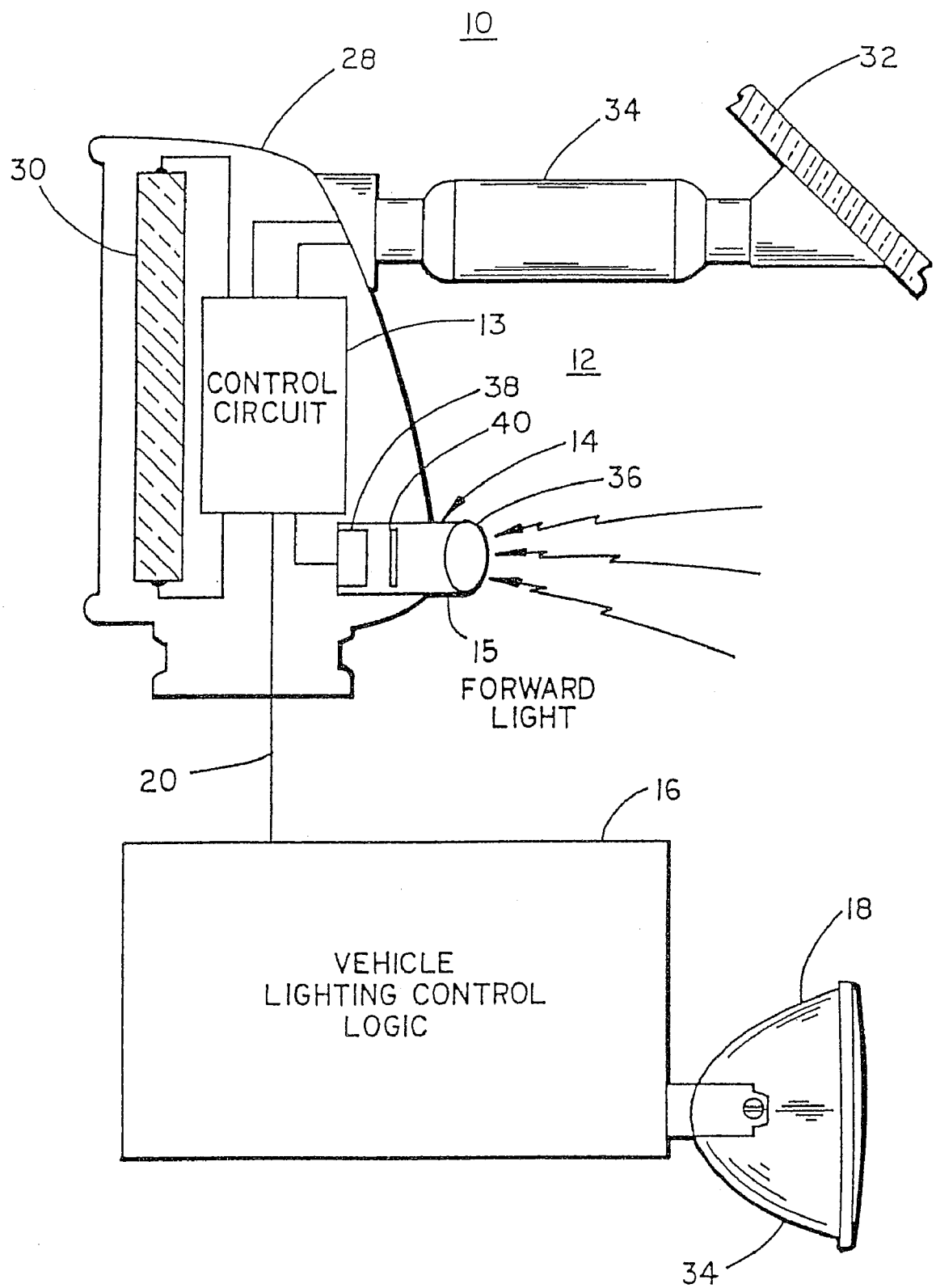
FIG. 10 is the same view as FIG. 2 of an alternative mounting arrangement.

Vehicle lighting control logic module 16 receives an input 20 from imaging control circuit 13. In particular embodiments, such as ones which adjust the state of the headlights between continuously variable states, module 16 may supply data to imaging control circuit 13, such as the speed of the vehicle, which may be combined with the data sensed by imaging sensor 14 in establishing the state of headlights 18. In the illustrated embodiment, imaging sensor module 14 may be fixedly mounted in a housing 28 by a bracket 34 mounted to, or near, the vehicle's windshield 32. Bracket 34 also mounts an interior rearview mirror 30. This is a preferred mounting for imaging sensor module 14 because the location within the interior of the vehicle substantially eliminates environmental dirt and moisture from fouling the light sensor module. Additionally, the position behind windshield 32, which typically is kept relatively clear through the use of washers and wipers and the like, ensures a relatively clear view of the scene forward of vehicle 10. Alternatively, imaging sensor module 14 may be mounted within a housing 29 of interior rearview mirror 30 facing forward with respect to vehicle 10 (FIG. 10). In such embodiment, control circuit 13 may be combined with the circuit which controls the partial reflectance level of mirror 30 if mirror 30 is an electro-optic mirror such as an electrochromic mirror. Other mounting techniques for sensor module 14 will be apparent to the skilled artisan.

Figure 3:
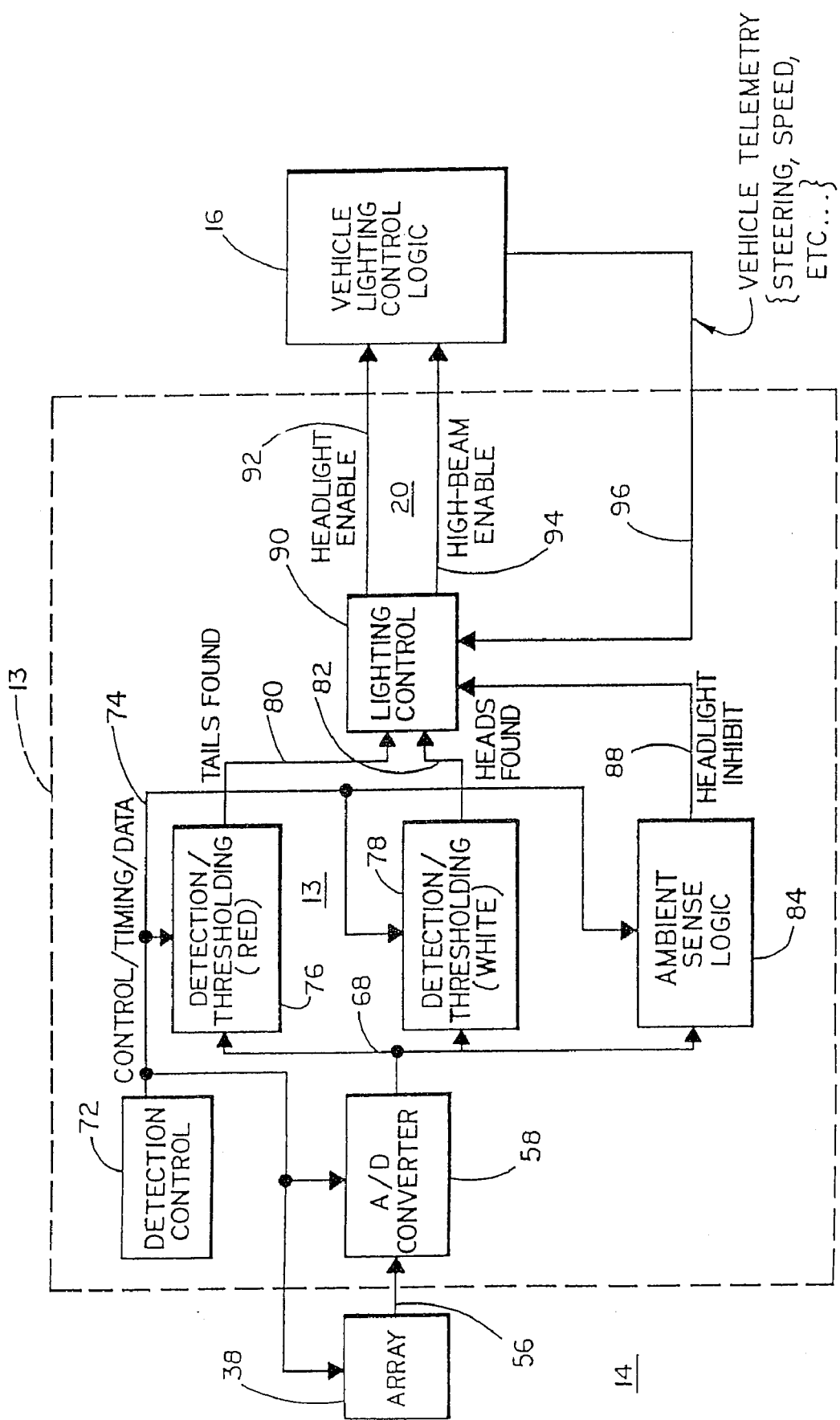
FIG. 3 is a block diagram of the control system in FIG. 2.
Figure 4:
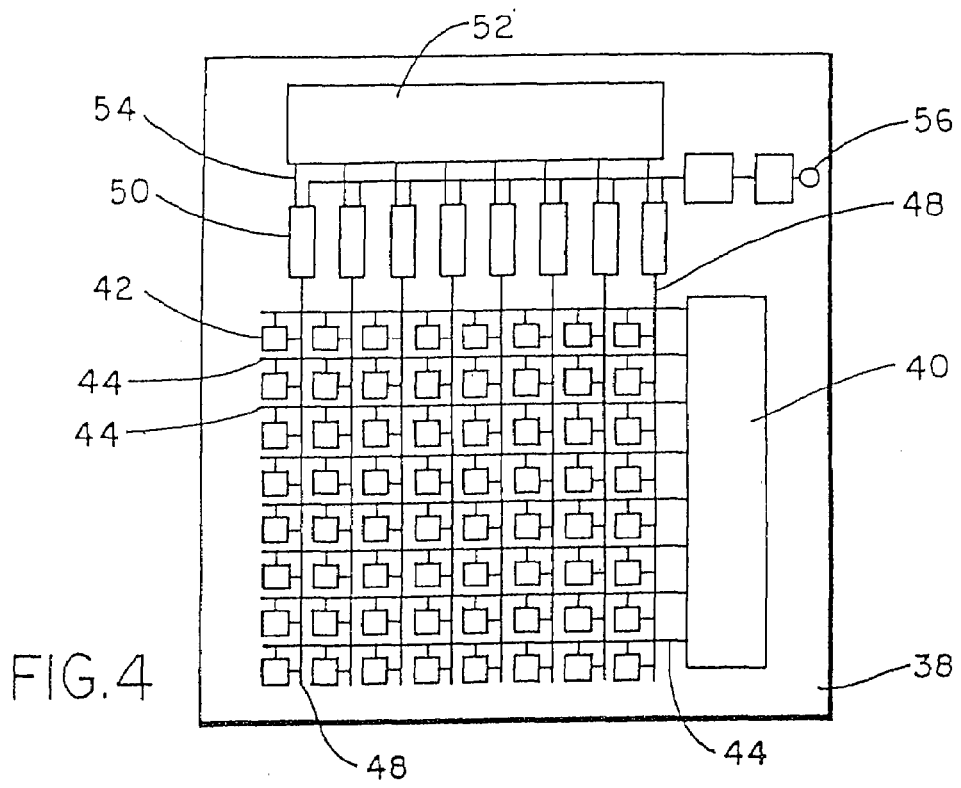
FIG. 4 is a layout of a light-sensing array useful with the invention.
Figure 5:
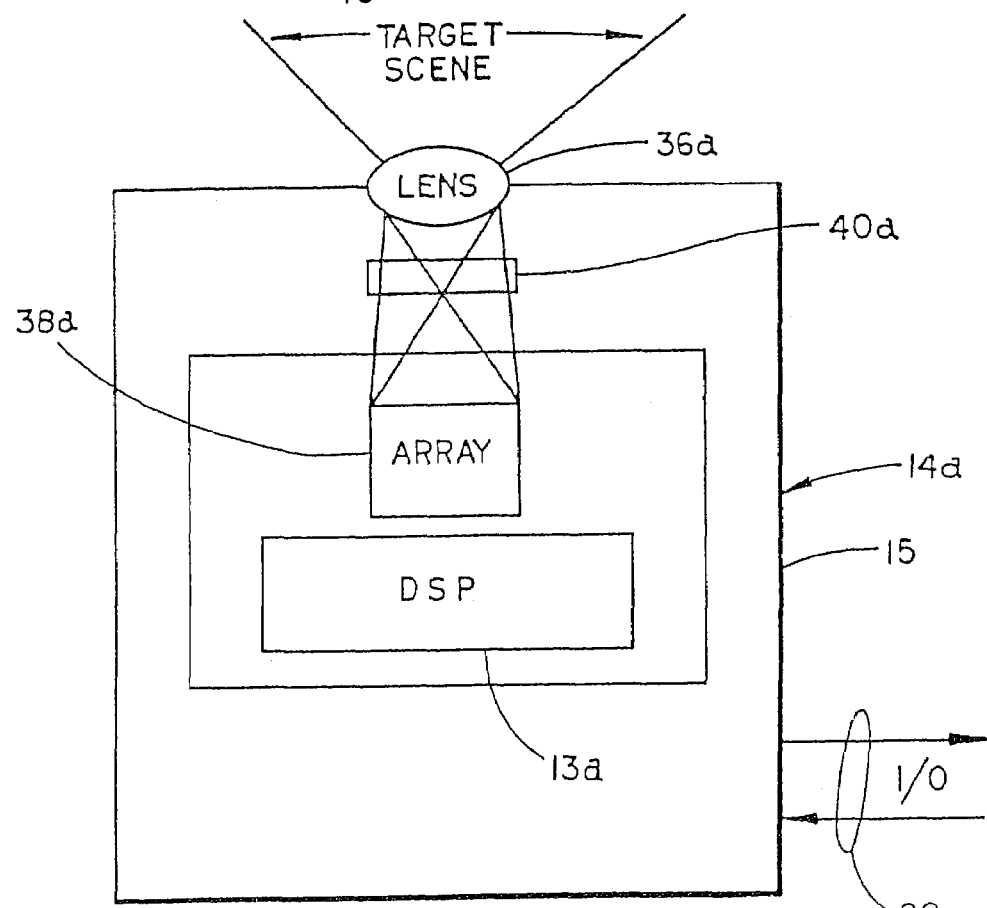
FIG. 5 is a block diagram of an imaging sensor.

Imaging sensor module 14 includes an optical device 36, such as a lens, an array 38 of photon-accumulating light sensors, and a spectral separation device for separating light from the scene forward of vehicle 10 into a plurality of spectral bands, such as a filter array 40 disposed between optical device 36 and light-sensing array 38. Light-sensing array 38 is described in detail in co-pending application Ser. No. 08/023,918 filed Feb. 26, 1993, by Kenneth Schofield and Mark Larson for an AUTOMATIC REARVIEW MIRROR SYSTEM USING A PHOTOSENSOR ARRAY, now U.S. Pat. No. 5,550,677, the disclosure of which is hereby incorporated herein by reference. Light-sensing array 36 includes a plurality of photosensor elements 42 arranged in a matrix of columns and rows (FIG. 4). In the illustrated embodiment, an array of 512 rows and 512 columns of light-sensing pixels, each made up of a photosensor element 42 is utilized. However, a greater or lesser number of photosensor elements may be utilized and may be arranged in matrix that is laid out in other than columns and rows. Each photosensor element 42 is connected to a common word-line 44. To access the photosensor array, a vertical shift register 46 generates word-line signals to each word-line 44 to enable each row of photosensor elements 42. Each column of photosensor elements is also connected to a bit-line 48 which is connected to an amplifier 50. As each word-line 44 is accessed, a horizontal shift register 52 uses a line 54 to output the bit-line signals on consecutive bit lines 48 to an output line 56. In this manner, each photosensor element 42 may be individually accessed by appropriate manipulation of shift registers 46 and 52. Output 56 is supplied to a digital signal processor 13 which is supplied on an output 62 as input to control circuit 13 (FIGS. 3-5).

Digital signal processor 13 includes an analog-to-digital converter 58 which receives the output 56 of array 36 and converts the analog pixel values to digital values. A digital output 68 of A/D converter 58 is supplied to a taillight detection circuit 76, a headlight detection circuit 78, and to ambient sense logic circuit 84. A detection control circuit 72 supplies control and timing signals on a line 74 which is supplied to array 38, A/D converter 58 taillight detection circuit 76, headlight detection circuit 78, and ambient sense logic 84. Such signals coordinate the activities of these modules and provide any data, from look-up tables provided in control circuit 72, needed by each circuit to perform its function. For example, control circuit 72 may provide intensity threshold levels to taillight detection circuit 76 and headlight detection circuit 78.

Taillight detection circuit 76 detects a red light source having an intensity above a particular threshold as follows. For each pixel that is "red," a comparison is made with adjacent "green" pixels and "blue" pixels. If the intensity of a red pixel is more than a particular number of times the intensity of the adjacent green pixel and adjacent blue pixel, then it is determined that the light source is red. If the intensity of the "red" light source is greater than a particular threshold, an indication is provided at 80.

Headlight detection circuit 78 detects a white light source having an intensity above a particular threshold as follows. A white light is a combination of red, green, and blue components. If adjacent "red," "green," and "blue" pixels all exceed a particular threshold, a ratio comparison is made of the pixels. If the ratio of the intensity of the adjacent "red," "green," and "blue" pixels is within a particular range, such as 20 percent by way of example, then a white light source is detected.

Vehicle headlight dimming control 12 additionally includes an ambient light-sensing circuit 84 which receives an input from digital output signal 68. Ambient detection circuit 84 samples a subset of photosensor elements and detects light levels sensed by the subset over a long period of time in order to produce significant time filtration. Preferably, the photosensor elements in the sensed subset include sensors that detect portions of the forward-looking scene that are just above the earth's horizon which is more indicative of the ambient light condition. Ambient detection circuit 84 produces an indication 88 of ambient light levels which is supplied as an input to a lighting control module 90. A high ambient light level may be used by a module 90 to inhibit headlight actuation or to switch headlights 18 to a daytime running light mode. Ambient detection circuit 84 can, optionally, perform other functions, such as switching the daytime running lights of the vehicle between daytime and nighttime modes, controlling the intensity of the vehicle's instrument panel and providing an input to an electro-optic rearview mirror system.

Indications 80 and 82 from the light detection units and indication 88 from ambient detection circuit 84 are supplied to a lighting control circuit 90 which produces a first indication 92 that headlights 18 are to be switched on, or switched from a daytime running condition to a night mode, and a high-beam enable indication 94 that the headlights may be switched to a high-beam state. Vehicle lighting control logic module 16 responds to indications 92 and 94 by switching headlights 18 to an appropriate mode. An output 96 from module 16 may be provided to supply lighting control circuit 90 with information with respect to vehicle telemetry, steering, speed, and any other parameter that may be incorporated into the algorithm to determine the state of the headlights of the vehicle. Digital signal processor 13 may be implemented using discrete digital circuit modules or with a suitably programmed micro-processor with input and output buffers.

In one embodiment, an imaging sensor module 14a includes a single photosensor array 38a, one spectral filter array 40a, and one optical device 36a (FIG. 5). In this illustrated embodiment, spectral filter array 40a includes alternating spectrum filter elements for exposing adjacent pixels to different regions of the electromagnetic spectrum in the red band or green band or blue band. This may be accomplished by arranging such filter elements in stripes or by alternating filter spectral regions in a manner known in the art. Digital signal processor 13a captures a frame of data by enabling photosensor array 38a for a particular exposure period during which each photosensor element 42 accumulates photons. In order to detect oncoming headlights, digital signal processor 13a enables photosensor array 38a for a first exposure period. In order to detect leading taillights, digital signal processor 13a enables photosensor array 38a for a second exposure period. Because oncoming headlights have an intensity level that is substantially greater than that of leading taillights, the exposure period of the frame in which leading taillights is detected is at least approximately ten times the length of the exposure period during which oncoming headlights are detected. Most preferably, the exposure period for detecting leading taillights is approximately 40 times the exposure period for detecting oncoming headlights. In the illustrated embodiment, an exposure period of 0.004 seconds is utilized for detecting taillamps and 0.0001 seconds for detecting oncoming headlamps. The exposure period is the time during which each photosensor element 42 integrates photons before being read and reset by digital signal processor 13a. Establishing a different exposure period for detecting headlights verses taillights facilitates the use of existing and anticipated sensor technology by accommodating the dynamic range of such sensor technology. Exposure may also be adaptively established on a priority basis. In one such embodiment, exposure is set to a shorter headlight setting. If headlights are detected, the headlights 18 of vehicle 10 are dimmed and the exposure period is kept short. If no headlights are detected, the next frame is set to a longer exposure period. This has the advantage of shorter system cycle time as well as a reduction in sensitivity to sensor saturation and blooming. In another such embodiment, the exposure period is initially set to a long period. If an oncoming headlight is tentatively detected, the exposure period could then be switched to a short period to confirm the observation.

Vehicle headlight dimming control 12 carries out a control routine 100 (FIGS. 7a-7d). At the beginning of each pass through the routine, which occurs for every frame captured by the imaging sensor, a frame is grabbed at 102 and all of the pixels in the frame are processed as follows. Counters used for detecting white headlight sources and red taillight sources are zeroed at 104. It is then determined at 106 whether the previously processed frame was for detecting headlights or taillights. This is determined by looking at a variable "process.tails" which will be set to "yes" if the previous frame was processed to detect headlights and will be set to "no" if the previous frame was processed to detect taillights. If it is determined at 106 that the variable "process.tails" is set to "yes," the control proceeds to 108 in order to process the next frame to detect taillights. If it is determined at 106 that the variable process.tails is set to "no," then control passes to 109 in order to process the next frame as a headlight detecting frame.

Figures 7A, 7B:
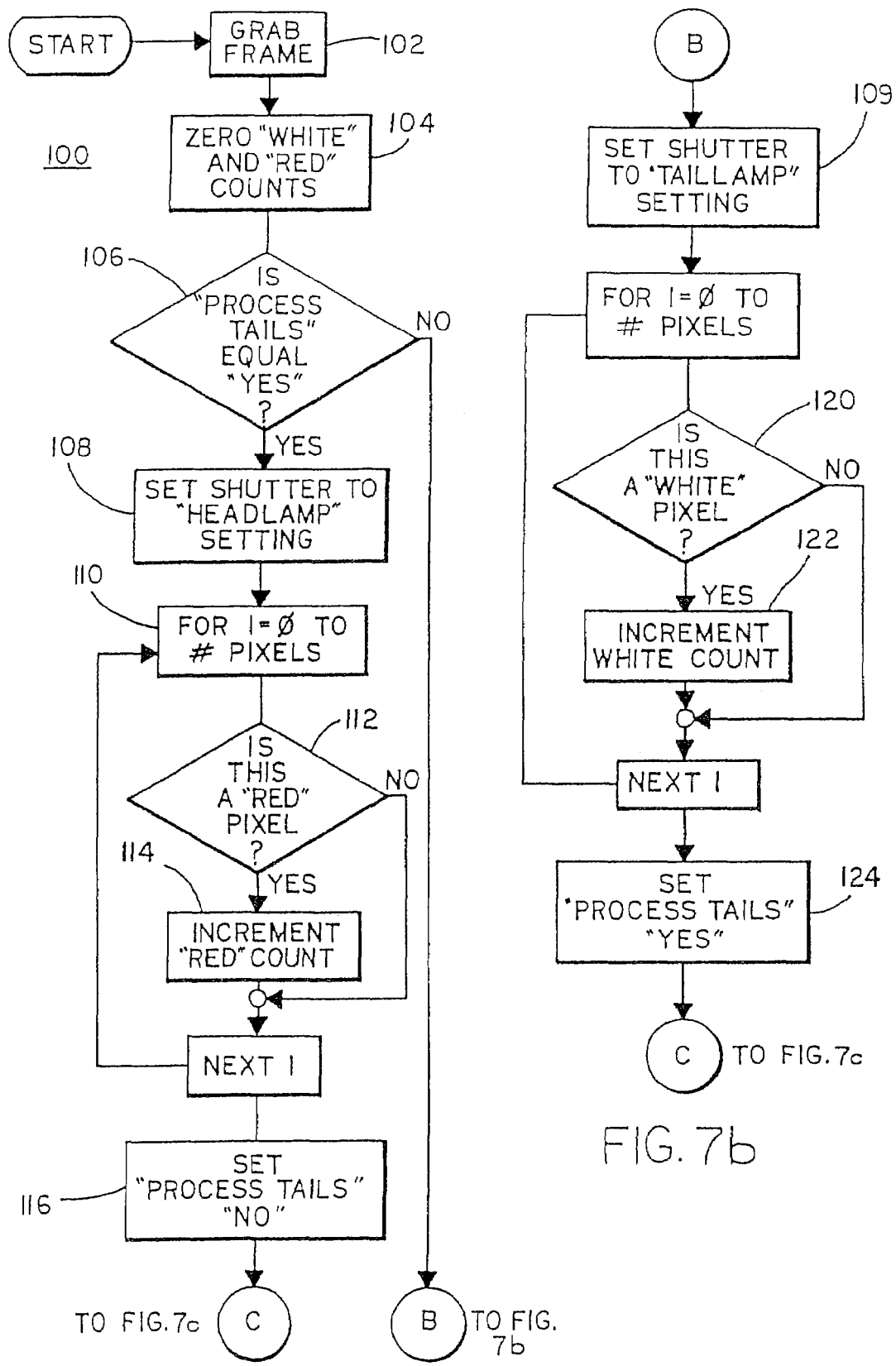
FIGS. 7a-7d are a flowchart of a control program.
Figures 7C, 7D:
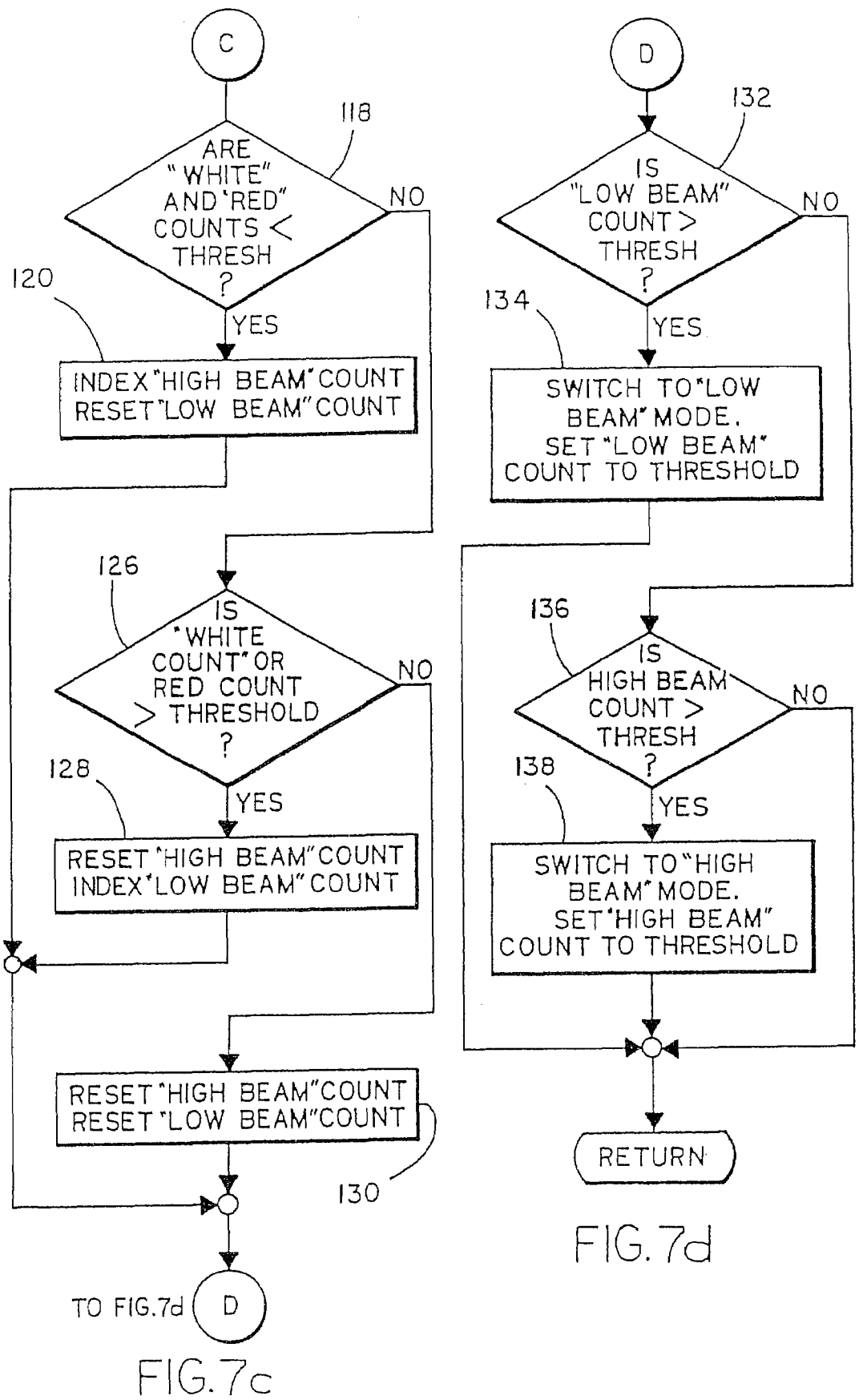

The taillight detecting frame process begins at 108 by setting the exposure period for the imaging sensor module to grab the next frame according to a headlamp exposure level. In the illustrated embodiment, the exposure period for detecting headlights is set at 0.0001 seconds. Processing of the taillight frame proceeds at 110 by examining, for each "red" pixel, whether the intensity of light sensed by that pixel is greater than a threshold and whether the intensity of light sensed by that pixel is greater than a selected number of multiples of the intensity of light sensed by an adjacent "blue" pixel and a selected number of multiples of the intensity of light sensed by an adjacent "green" pixel. If so, then a "red" counter is incremented at 114. Preferably, the ratio of red pixel intensity to green or blue pixel intensity is selected as a power of 2 (2, 4, 8, 16 . . . ) in order to ease digital processing. However, other ratios may be used and different ratios can be used between red/green and red/blue pixels. In the illustrated embodiment, a ratio of 4 is selected based upon ratios established from CIE illuminant charts known to skilled artisans. Based upon these charts, a ratio greater than 4 would provide greater discrimination. Such greater discrimination may not be desirable because it could result in failure to identify a leading taillight and, thereby, a failure to dim the headlights of the controlled vehicle. After all pixels have been processed, the parameter "process.tails" is set to "no" at 116 and control proceeds to 118 (FIG. 7c).

In a similar fashion, processing of a headlight frame begins at 110 by setting the exposure period for the imaging sensor module to grab the next frame as a red taillight detecting frame. This is accomplished by setting the exposure period of the imaging sensor module to 0.004 seconds. It is then determined at 120 for each pixel whether an adjacent set of "red," "green," and "blue" pixels each exceeds a particular threshold and whether the pixel intensity levels all fall within a particular range, such as within 20 percent of each other. If all of the red, green, and blue pixels exceed a threshold and pass the ratio test, then it is determined that a white light source is being sensed and a "white" counter is incremented at 122. After all of the pixels in the frame have been processed, the process.tails flag is set to a "yes" state at 124. Control then passes to 118.

It is determined at 118 whether both the "white" and the "red" counters are below respective high-beam thresholds. If so, a high-beam frame counter is incremented and a low-beam frame counter is set to zero at 120. If it is determined at 118 that both the "white" and the "red" counters are not less than a threshold, it is then determined at 126 whether either the "red" counter or the "white" counter is greater than a respective low-beam threshold. If so, the high-beam frame counter is set to zero and the low-beam frame counter is incremented at 128. If it is determined at 126 that neither the "red" counter or the "white" counter is greater than the respective low-beam threshold, then both the high-beam frame counters and the low-beam frame counters are set to zero at 130.

Control then passes to 132 where it is determined if the low-beam frame counter is greater than a particular threshold. If so, high-beam enable signal 94 is set to a "low-beam" state at 134. Additionally, the low-beam frame counter is set to the threshold level. If it is determined at 132 that the low-beam frame counter is not greater than its threshold, it is determined at 136 whether the high-beam frame counter is greater than its threshold. If so, high-beam enable signal 94 is set to "high-beam" state at 138 and the high-beam frame counter is reset to its threshold level.

Control routine 100 provides hysteresis by requiring that a headlight spectral signature or a taillight spectral signature be detected for a number of frames prior to switching the headlights to a low-beam state. Likewise, the absence of a detection of an oncoming headlight or a leading taillight must be made for multiple frames in order to switch from a low-beam to a high-beam state. This hysteresis guards against erroneous detection due to noise in a given frame and eliminates headlamp toggling when sources are at the fringe of detection range. In the illustrated embodiment, it is expected that a vehicle headlight control system 12 will respond to a change in the state of light sources in the forward field of view of the vehicle in less than 0.5 seconds. An additional level of hysteresis may be provided by forcing the headlamps to stay in a low-beam state for a given number of seconds after a transition from high beams to low beams. The reverse would not occur; namely, holding a high-beam state for a particular period to avoid annoyance to drivers of oncoming or leading vehicles.

In the illustrated embodiment, red light sources, which have the spectral signature and intensity of taillights, are detected by determining that a "red" pixel, namely a pixel which is exposed to light in the visible red band, is both greater than a given multiple of the "green" and "blue" adjacent pixels, as well as being greater than a threshold and that white light sources, which are the spectral signatures of headlights, are detected by determining that "red," "green," and "blue" pixels are both within a particular intensity range of each other as well as being greater than a threshold. This double-testing helps to reduce false detection of light sources. However, it would be possible to detect red light sources only by looking at the intensity of "red" pixels and to detect white light sources by determining that an adjacent set of "red," "blue," and "green" pixels are all above a particular threshold.

Figure 8C:
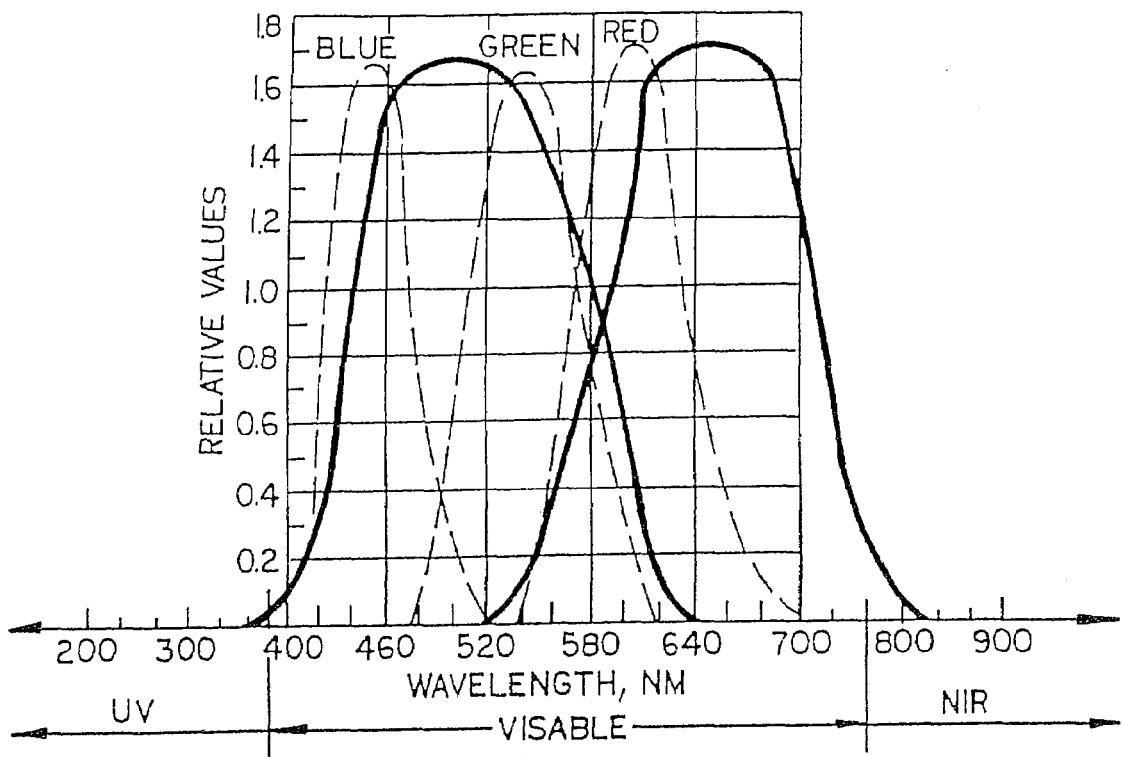
FIGS. 8a-8c are spectral charts illustrating spectra regions useful with the invention.
Figure 8A:
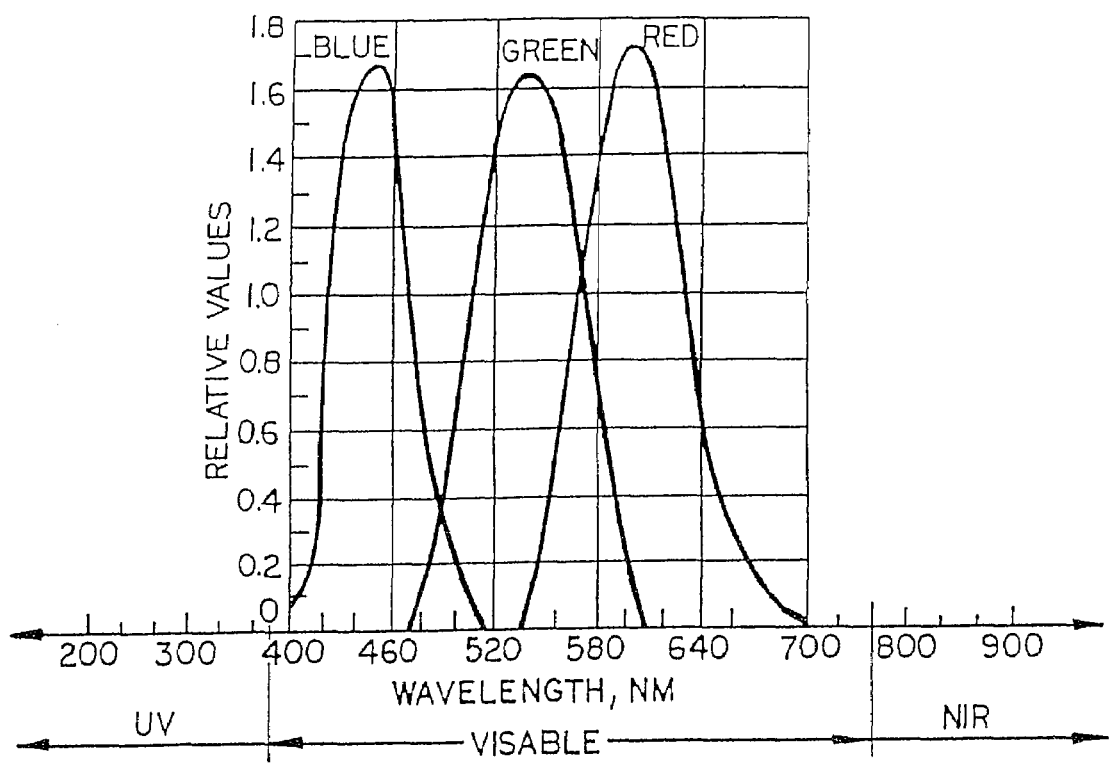
Figure 8B:
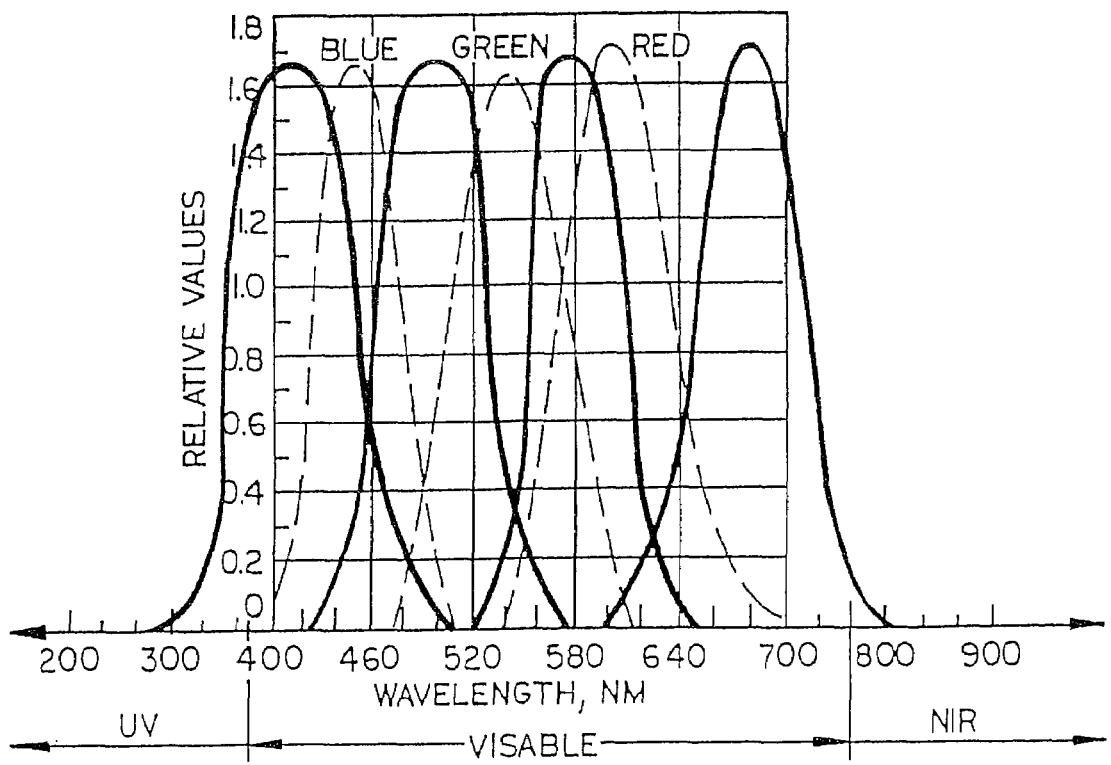

In the illustrated embodiment, spectral filtering is carried out in a manner which exposes each photosensing element in the photosensor array to a band of light falling within one of the primary ranges of the visible spectrum, namely red, green, or blue as illustrated in FIG. 8a. However, different bands in the frequency spectrum may be utilized including not only visible spectrum bands but invisible spectrum bands including infrared and ultraviolet bands as illustrated in FIG. 8b. The band selection could also be chosen from visible spectral regions that do not correspond with the primary spectrums. For example, the spectral filter may be selected in order to detect at the pixel level red light sources and the complement of red light sources as illustrated in FIG. 8c. These binary indications could be utilized to detect red taillights by determining that the "red" pixel is greater than a threshold and greater than a number of multiples of the intensity sensed by the "red complement" pixel adjacent thereto. Likewise, a white light source indicative of oncoming headlights could be detected by determining that both the "red" pixel and the "red complement" pixel adjacent thereto are both above a particular threshold and within a particular intensity range of each other. It may also be desirable to select bands that fall between primary spectrum regions or any other bands that may be desirable for a particular application.

Photosensing array 38 may be a charge couple device (CCD) array of the type commonly utilized in video camcorders and the like. Alternatively, photosensing array 38 could be a CMOS array of the type manufactured by VLSI Vision Ltd. (VVL) in Edinburgh, Scotland. Additionally, a hybrid of the CCD and CMOS technology may be employed. Other potentially useful photosensing technologies include CID, MOS, photo diodes, and the like.

Figure 6:
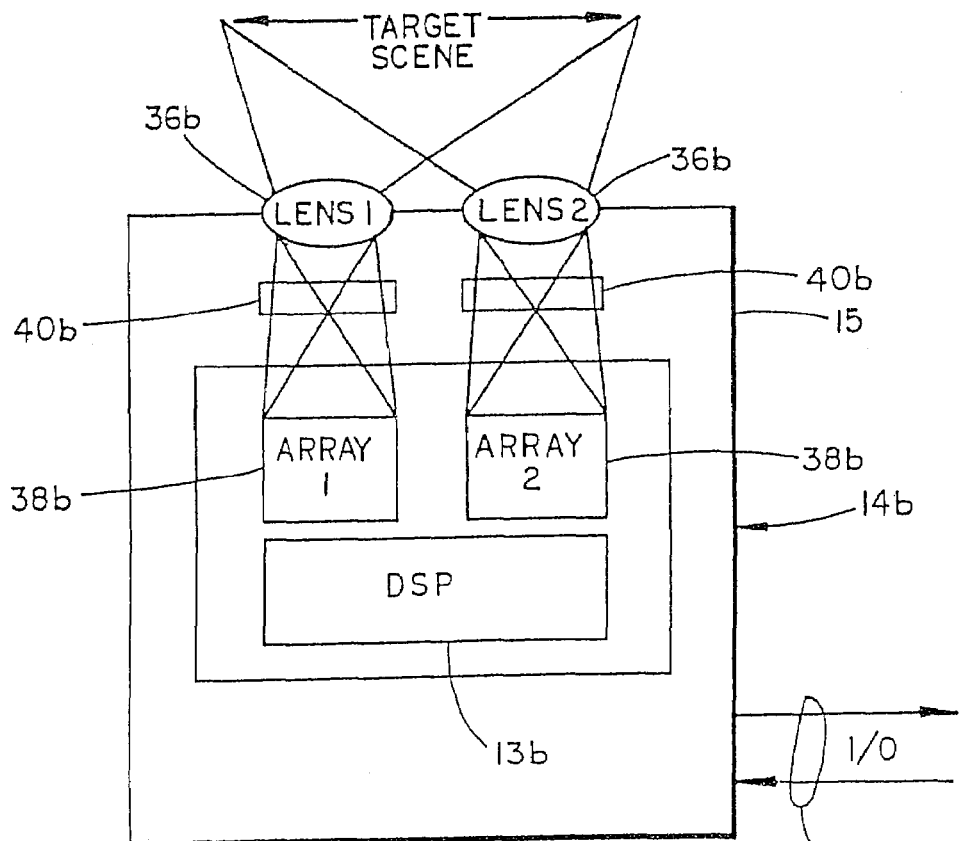
FIG. 6 is an alternative embodiment of an imaging sensor.

In an alternative embodiment, an imaging sensor module 14b includes two or more pairs of photosensor arrays 38b (FIG. 6). Each photosensor array 38b has an associated spectral filter array 40b and optical device 36b. In this embodiment, each array 38b is operated by digital signal processor 58b to have an exposure period that is set for detecting either oncoming headlights or leading taillights. In this manner, each frame of the scene captured by each array is utilized to detect a particular light source. This is in contrast to light-sensing module 14a in FIG. 5 in which each light source is detected in alternating frames. Each spectral filter 40b is identical, whereby each array 38b is capable of detecting light sources having spectrum composition including red, green, and blue regions of the spectrum. However, the spectral filters may be custom configured to the particular application. This may result in a homogeneous composition or a more complex mosaic, especially where light sources are examined in three or more spectral regions.

Figure 9:
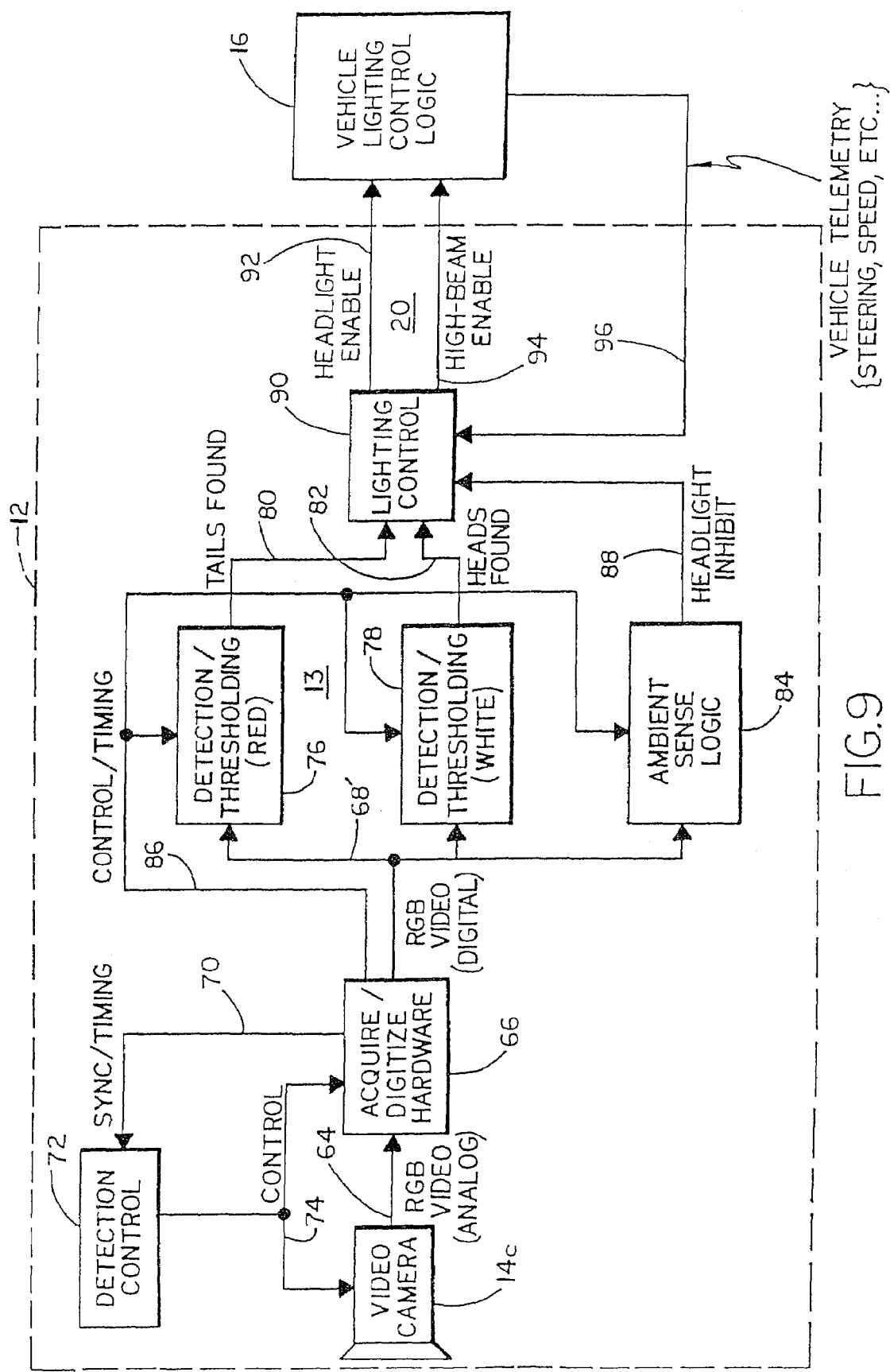
FIG. 9 is the same view as FIG. 3 of another alternative embodiment.

In yet an additional single lens system embodiment, an imaging sensor module 14c includes three light-sensing arrays (not shown) and a spectral separation device overlying the light-sensing arrays which directs spectral bands to different arrays (FIG. 9). An example of such spectral separation device is a refracting optical splitter, such as dichroic mirrors or prisms. In this manner, each light-sensing array detects light in either the red or green or blue region of the spectrum. As such, imaging sensor module 14c produces three output signals on a line 64, each representing detected light in one of the red or green or blue spectral regions. The output signals on line 64 include frame-timing signals which are decoded by digital acquisition circuits 66 which produces a digital output signal 68' indicative of intensity levels of adjacent red, green, and blue pixels. Digital acquisition circuit 66 additionally produces a timing signal output 70 which is utilized by a detection control circuit 72 in order to supply synchronizing signals, at 74, to imaging sensor module 14c and digital acquisition circuit 66. A control and timing signal 86 is produced by digital acquisition circuit 66 and supplied to detection circuits 76 and 78 and ambient detection circuit 84 in order to enable the circuits to distinguish between subsequent frames captured by the light-sensing modules. As with previously described embodiments, digital output signal 68' is supplied to taillight detection circuit 76, headlight detection circuit 78, and ambient sense logic circuit 84.

Figure 11A:
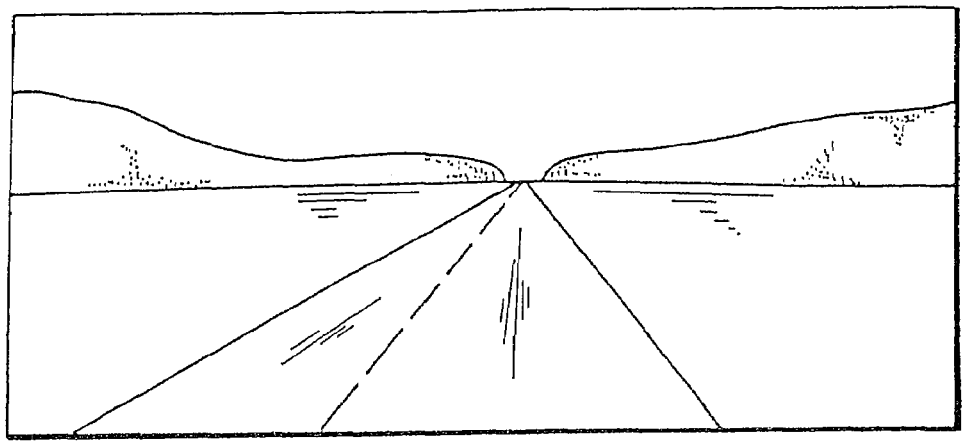
FIGS. 11a-11c are views forward of a vehicle illustrating different forms of spatial filtering.

The present invention is capable of identifying point sources of light in any particular location within the scene viewed forward of the vehicle. Additional discrimination between oncoming headlights and leading taillights may be accomplished by taking into account the relative location of the source of light within the scene. For example, as best seen by reference to FIG. 11a, particular relationships have been discovered to exist between light sources of interest and their spatial location forward of the vehicle. Oncoming headlights and leading taillights of interest can be characterized, at least in part, based upon their displacement from the central axis of the vehicle. On-axis light sources of interest can be at both close and far away separation distances. However, off-axis light sources may only be of interest if at a close separation distance from the vehicle. Assuming for illustration purposes that headlights and taillights are of the same size, headlights and taillights of interest occupy an increasing spatial area as they move off axis. Therefore, the resolution required to detect lights of interest may decrease off axis. Additionally, the fact that close-up off-axis light sources have significant spatial area would allow image-processing techniques to be employed to discriminate between close-up off-axis light sources of interest and distant off-axis light sources, which are not of interest. This may be accomplished through customized optics or other known variations in pixel resolution. Furthermore, headlights and taillights of interest are of greater intensity, because of their closeness, off axis. This allows an increase in intensity detection thresholds off axis without missing detection of such light sources. This increase in detection threshold and reduction in resolution off axis assists in avoiding false detection of light sources not of interest, such as a streetlights, building lights, and the like.

Figure 11B:
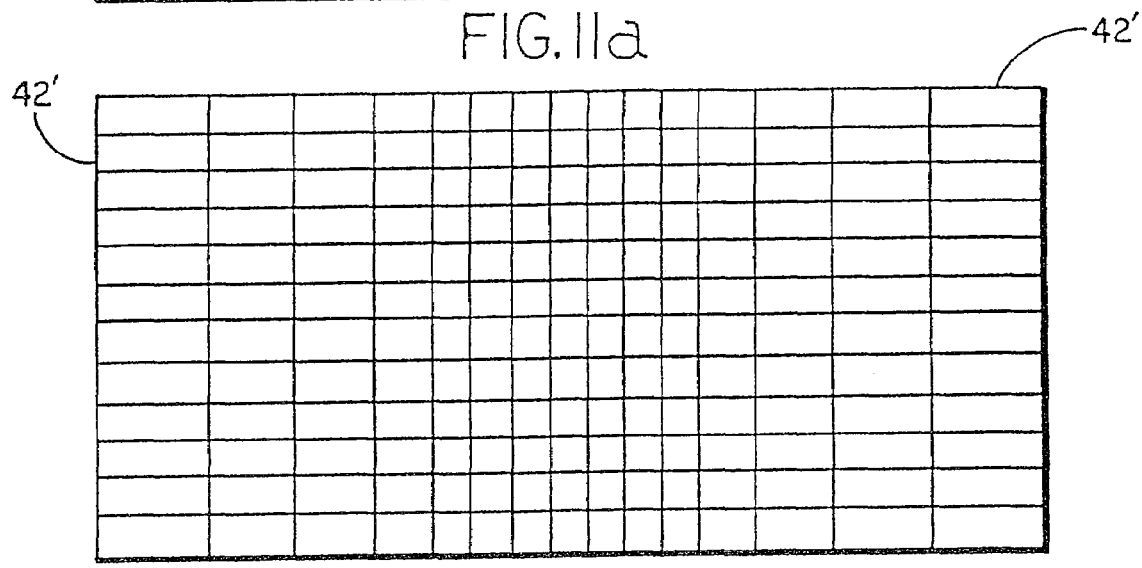
Figure 11C:
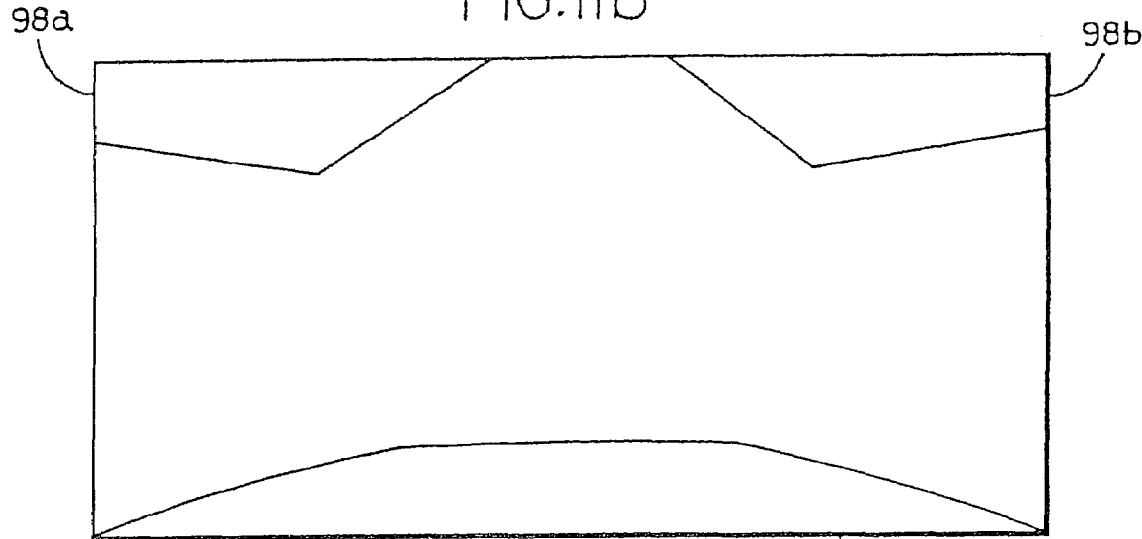

In order to take into account this spatial differentiation, the present invention comprehends detecting light sources at a lower threshold centrally of the scene and at a higher threshold at the periphery of the scene. This may be accomplished either optically, or electronically, or both. Optically, this may be accomplished by providing a non-uniform magnification to optical device 36. For example, an optical device may have optical magnification at a central portion thereof and an optical attenuation at a peripheral region thereof. Additionally, optical device 36 may have a relatively wide horizontal field of view and a relatively narrow vertical field of view. The narrow vertical field of view would tend to reduce the detection of street lights and other overhead light sources. In a preferred embodiment, optical device 36 is a lens that is made from injection-molded plastic. Electronically, such spatial differentiation may be accomplished by establishing a higher threshold level for pixel intensity detection for pixels located at the periphery of the scene than for pixels located centrally of the scene. This would cause centrally positioned light sources to be detected at a lower intensity level than sources detected at the periphery of the scene. Such spatial differentiation could also be accomplished by a non-symmetrical mapping of light to the sensor array, as illustrated in FIG. 11b, or by masking portions 98a, 98b, and 98c, at the periphery of the scene, as illustrated in FIG. 11c, so that these portions are not sensed at all. Spatial differentiation could also be accomplished by providing non-uniform pixel size.

The present invention is exceptionally sensitive to sources of light having spectral signatures of oncoming headlights and leading taillights. By recognizing the spectral signature of the light sources, many non-relevant light sources may be ignored. By examining light sources pixel-by-pixel, relatively small light sources may be detected at great distances in order to dim the headlights well before they become a nuisance to the driver of the vehicle ahead of the control vehicle. This is accomplished, according to a preferred embodiment, by utilizing an imaging sensor made up of an array of photosensing elements in a compact design which responds to light sources in a scene forward of the vehicle. Furthermore, such sensor preferably utilizes digital processing techniques which are well adapted for use with custom digital electronic circuitry, avoiding the expense and speed constraints of general purpose programmable microprocessors.

The present invention takes advantage of the spectral signatures both of light sources which must be detected in a headlight dimming control as well as the spectral signatures of light sources which must be rejected in a headlight dimming control. For example, federal regulations establish specific spectral bands that must be utilized in vehicle taillights; namely red. Furthermore, federal legislation prohibits the use of red light sources in the vicinity of a highway. Lane markers, signs, and other sources of reflected light are all specified in a manner which may be readily identified by spectral signature. Oncoming headlights, according to known technology, have a visible spectral signature which is predominantly white light.

As light source technology evolves, the present invention facilitates detection of other spectral signatures of light sources in the future.

The present invention is capable of utilizing spatial filtering to even further enhance the ability to identify light sources. By spatial filtering is meant consideration of not only whether a particular pixel, or pixel group, is detecting a light source having a particular spectral signature, but also what adjacent, or closely related, pixels or pixel groups, are detecting. For example, it can be concluded that very closely adjacent red and white light sources are not of interest as oncoming headlights or taillights. An example where such pattern could be observed is a streetlight observed with a system having imperfect color correction, which can produce a white light surrounded by a red halo. By evaluation of adjacent pixel groups, a closely proximate red light source and white light source can be identified as a streetlight and not either a headlight or a taillight.

Pattern recognition may be used to further assist in the detection of headlights, taillights, and other objects of interest. Pattern recognition identifies objects of interest based upon their shape, reflectivity, luminance, and spectral characteristics. For example, the fact that headlights and taillights usually occur in pairs could be used to assist in qualifying or disqualifying objects as headlights and taillights. By looking for a triad pattern, including the center high-mounted stoplight required on the rear of vehicles, stoplight recognition can be enhanced. Furthermore, object recognition can be enhanced by comparing identified objects over successive frames. This temporal processing can yield information on object motion and can be used to assist in qualifying or disqualifying objects of interest.

Figure 12A:
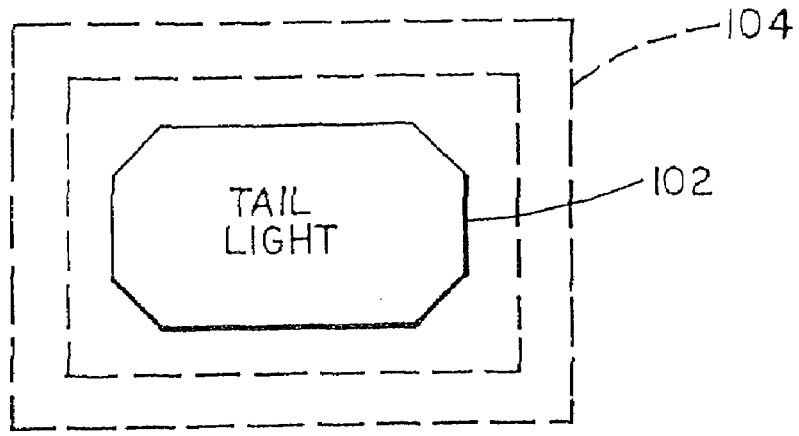
FIGS. 12a and 12b are illustrations of use of the invention to detect particular atmospheric conditions.
Figure 12B:
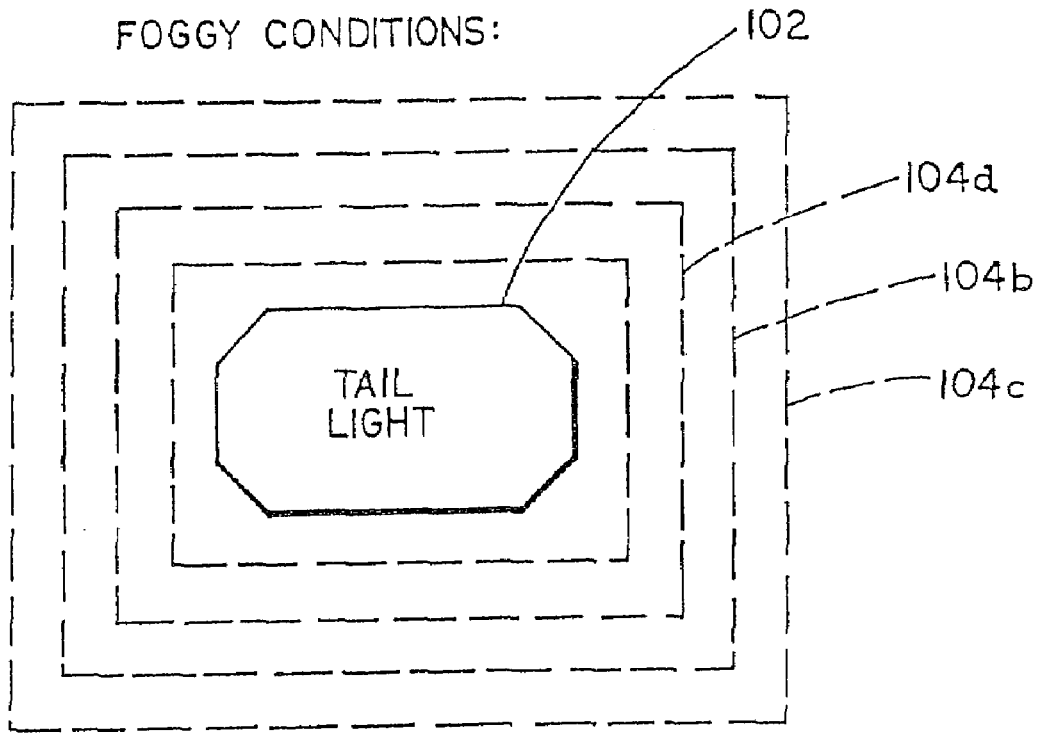

Spatial filtering can also be useful in identifying atmospheric conditions by detecting effects on light sources caused by particular types of atmospheric conditions. One such atmospheric condition is fog. A bright light source 102 is surrounded by a transition region 104 between the intensity of the light source and the black background (FIG. 12*a*). Fog, or fine rain, tends to produce a dispersion effect around light sources which causes a series of transition regions 104*a*, 104*b* . . . 104*n* which extend further from the light source (FIG. 12*b*). By placing appropriate limits on the size of the transition region, fog or light rain, or a mixture of both, or other related atmospheric conditions, can be detected. In response to such atmospheric conditions, vehicle headlight dimming control 12 may activate fog lights, inhibit switching to high beams, or perform other control functions. Furthermore, fog, or fine rain, can be detected, or confirmed, by analyzing the effects of headlights 18 in the forward scene as reflected off of moisture particles.

Spatial filtering can also be used to detect rain on windshield 32. This may be accomplished by performing statistical analyses between a pixel, or pixel group, and adjacent pixels or pixel groups. A view forward of a vehicle through a dry windshield would be sensed by an imaging sensor module as continuously varying differences between adjacent pixels, or pixel groups, assumed to be under constant illumination from light sources. When, however, a droplet of water or a snowflake is on windshield 32, an effect is created which causes a lack of continuous variation of differences between adjacent pixels, or pixel groups. This has the tendency to reduce the first derivative of the pixel, a condition which can be determined by processing.

Processing can be used to determine the first derivative of an image captured by image-sensing module 14 by determining a measure of the entropy, or disarray, of a pixel, or pixel group, with respect to its neighbors. For example, an approximation of the first derivative for a pixel is:

$$\frac{d(P_i)}{dxy} = \frac{\sqrt{\sum_{j=1}^{n}(Pi-Pj)^2}}{N}$$

where N=8 and where Pi is a given pixel and Pj is one of 8 neighboring pixels.

It should be apparent to those skilled in the art that the invention is capable of performing control functions other than controlling the dimming of the vehicle's headlights. For example, spectral signature identifications may be utilized to detect the state of a traffic light to either warn the driver that a light has changed from green to yellow to red or to automatically decelerate and stop the vehicle. Also, by sensing that the intensity of a leading taillight has abruptly increased, a condition where the leading vehicle is braking may be identified and suitable action taken.

The invention may be utilized to identify particular traffic signs by their spectral signature as well as their geometric organization. For example, red octagons may be identified as stop signs, yellow triangles as caution signs, and the like. These capabilities are a result of the present invention providing a significant reduction in the amount of data to be processed because the image forward of the vehicle is captured in a manner which preselects data. Preselection of data is accomplished by configuring the sensor array, including the optics thereof, to consider the spatial, as well as the spectral, characteristics of light sources.

The present invention may be used to determine the environment in which the vehicle is operated. For example, a high level of "non-qualified" light sources; namely, light sources that are not headlights or taillights, as well as "qualified" light sources can be used to determine a measurement of the activity level around the vehicle; namely, that the vehicle is in an urban environment which may be a useful input for particular control algorithms. This may be accomplished as follows. An activity counter is established which represents a total number of pixels, or pixel groups, whose red, green, or blue components exceed a threshold. The threshold is set to a relatively low value, namely just above the noise floor. This counter, which registers any real detected source, is reset and retabulated every frame, preferably during the exposure period for detecting taillights. If the activity counter exceeds a particular value, then a high activity environment is detected. One use of this information would be to inhibit the control from switching the vehicle's headlights from a low-beam state to a high-beam state unless a low activity condition exists for awhile. The activity counter may be used by the control in combination with a low-beam duration counter which records the number of frames that the system has been in a low-beam state. It is reset upon system power-up and at every transition from the high-to-low beam states. The control may be inhibited from switching the vehicle's headlights to the high-beam state unless either the low-beam duration counter exceeds a value or the activity counter indicates a sustained low activity condition.

The present invention can be used to detect lane markers in order to either assist in steering the vehicle or provide a warning to the driver that a lane change is occurring. The capability of the invention to detect rain on the vehicle's windshield could be used to control the vehicle's wipers both between OFF and ON conditions and to establish a frequency of intermittent operation.

Changes and modifications in the specifically described embodiments can be carried out without departing from the principles of the invention which is intended to be limited only by the scope of the appended claims, as interpreted according to the principles of patent law including the doctrine of equivalents.

The embodiments of the invention in which an exclusive property or privilege is claimed are defined as follows:

1. An automatic exterior light control, comprising:
    an image array sensor, said image array sensor comprising an array of pixel sensors, wherein said image array sensor is configured and mounted such that a field of view of said image array sensor substantially passes through an associated windshield area that is wiped by a windshield wiper; and
    a controller connected to said image array sensor and configured to receive at least a portion of at least one image from said image array sensor that is substantially free of windshield surface contamination, said controller, responsive to said image array sensor, generating an output for controlling at least one exterior light of the vehicle.

2. An automatic exterior light control as in claim 1 wherein an image array sensor aim is adjustable electronically.

3. An automatic exterior light control as in claim 1 wherein an image array sensor aim is automatically adjusted.

4. An automatic exterior light control as in claim 1 comprising an ambient light level input.

5. An automatic exterior light control as in claim 4 wherein automatic exterior light control is enabled when an ambient light level is below a threshold.

6. An automatic exterior light control as in claim 1 comprising an exterior light control signal comprising a variable rate of change.

7. An automatic exterior light control as in claim 1 comprising a variable exterior light control signal threshold.

8. An automatic exterior light control as in claim 1 wherein at least one image acquired from said image array sensor covers a glare area including points at which drivers of oncoming and leading vehicles would perceive the headlamps to cause excessive glare, said image is processed to determine if at least one oncoming or leading vehicle is within a glare area and if at least one vehicle is within the glare area, the headlamp illumination range is reduced.

9. An automatic exterior light control, comprising:
    an image array sensor, said image array sensor comprising an array of pixel sensors, wherein said image array sensor is configured and mounted such that a field of view of said image array sensor is adjustable electronically; and
    a controller connected to said image array sensor configured to acquire pixel data from a subset of pixels associated with a desired field of view, said controller, responsive to said image array sensor, generating an output for controlling at least one exterior light of the vehicle.

10. An automatic exterior light control as in claim 9 wherein an image array sensor aim is automatically adjusted.

11. An automatic exterior light control as in claim 9 wherein said image array sensor is configured and mounted such that a field of view of said image array sensor substantially passes through an associated windshield area that is wiped by a windshield wiper.

12. An automatic exterior light control as in claim 9 comprising an ambient light level input.

13. An automatic exterior light control as in claim 12 wherein automatic exterior light control is enabled when an ambient light level is below a threshold.

14. An automatic exterior light control as in claim 9 comprising an exterior light control signal comprising a variable rate of change.

15. An automatic exterior light control as in claim 9 comprising a variable exterior light control signal threshold.

16. An automatic exterior light control as in claim 9 wherein at least one image acquired from said image array sensor covers a glare area including points at which drivers of oncoming and leading vehicles would perceive the headlamps to cause excessive glare, said image is processed to determine if at least one oncoming or leading vehicle is within a glare area and if at least one vehicle is within the glare area, the headlamp illumination range is reduced.

17. An automatic exterior light control, comprising:
    an image array sensor, said image array sensor comprising an array of pixel sensors; and
    a controller configured with an ambient light input, said controller, responsive to said image array sensor, generating an output for controlling at least one exterior light of the vehicle, wherein automatic exterior light control is enabled when an ambient light level is below a threshold, wherein manual operation of exterior lights remains functional.

18. An automatic exterior light control as in claim 17 wherein said ambient light input is derived from said image array sensor.

19. An automatic exterior light control as in claim 17 wherein an image array sensor aim is adjustable electronically.

20. An automatic exterior light control as in claim 17 wherein an image array sensor aim is automatically adjusted.

21. An automatic exterior light control as in claim 17 wherein said image array sensor is configured and mounted such that a field of view of said image array sensor substantially passes through an associated windshield area that is wiped by a windshield wiper.

22. An automatic exterior light control as in claim 17 comprising an exterior light control signal comprising a variable rate of change.

23. An automatic exterior light control as in claim 17 comprising a variable exterior light control signal threshold.

24. An automatic exterior light control as in claim 17 wherein at least one image acquired from said image array sensor covers a glare area including points at which drivers of oncoming and leading vehicles would perceive the headlamps to cause excessive glare, said image is processed to determine if at least one oncoming or leading vehicle is within a glare area and if at least one vehicle is within the glare area, the headlamp illumination range is reduced.

* * * * *